(12) United States Patent
Summers

(10) Patent No.: US 9,927,454 B2
(45) Date of Patent: Mar. 27, 2018

(54) WIRELESS IMMERSIBLE ANEMOMETER FOR SAILBOATS

(71) Applicant: Craig Summers, Halifax (CA)

(72) Inventor: Craig Summers, Halifax (CA)

( * ) Notice: Subject to any disclaimer, the term of this patent is extended or adjusted under 35 U.S.C. 154(b) by 274 days.

(21) Appl. No.: 14/898,914

(22) PCT Filed: May 9, 2014

(86) PCT No.: PCT/CA2014/000416
§ 371 (c)(1),
(2) Date: Dec. 16, 2015

(87) PCT Pub. No.: WO2014/201540
PCT Pub. Date: Dec. 24, 2014

(65) Prior Publication Data
US 2016/0370399 A1    Dec. 22, 2016

Related U.S. Application Data

(60) Provisional application No. 61/836,870, filed on Jun. 19, 2013, provisional application No. 61/927,757, filed on Jan. 15, 2014.

(51) Int. Cl.
*G01P 5/06* (2006.01)
*B63B 49/00* (2006.01)
(Continued)

(52) U.S. Cl.
CPC .............. *G01P 5/06* (2013.01); *B63B 49/00* (2013.01); *G01P 1/026* (2013.01); *G01P 5/07* (2013.01);
(Continued)

(58) Field of Classification Search
None
See application file for complete search history.

(56) References Cited

U.S. PATENT DOCUMENTS 3,753,371 A * 8/1973 Anderson ............... G01W 1/06
374/109
4,236,504 A * 12/1980 Cornelison, Jr. ......... F03D 7/06
126/247
(Continued)

FOREIGN PATENT DOCUMENTS

CN          202075301 U       12/2011

OTHER PUBLICATIONS

Summers, New Wind Instrument Designed for Heeling Sailbotas, GAM on Yachting, pp. 36-38, Summer 2013.
Armagh Observatory, "Cup-anemometer by Munro 1870", pp. 1-2, last revised Oct. 28, 2011, www.arm.ac.uk/history/instruments/Robinson-cup-anemometer.html.
(Continued)

*Primary Examiner* — Andre Allen
(74) *Attorney, Agent, or Firm* — Kagan Binder, PLLC

(57) ABSTRACT

A machine is disclosed for wind sensing on sailboats. Wind is important for sailing, but sailboats lean away from the wind when under sail. Vertical wind angles reduce the accuracy of existing anemometers. The cup blades disclosed here do not lose rotation speed when heeling over. Since it is now easy to have a sophisticated chartplotter display on a mobile device in waterproof case even on small boats, this waterproof wind sensor is a wireless "appcessory" that can talk to smartphones, tablets, computers, e-readers and marine electronics. The circuit board is encapsulated and is itself the wind direction arrow. A fluxgate compass on the circuit board provides wind direction. The apparatus is solar-powered, so there is no wiring to install or chafe. This allows a further inventive step for raising the anemometer using the mast track without needing to climb up or lower the mast.

25 Claims, 11 Drawing Sheets

(51) Int. Cl.
*G01P 13/02* (2006.01)
*G01P 1/02* (2006.01)
*G01P 5/07* (2006.01)
*B63B 17/00* (2006.01)

(52) U.S. Cl.
CPC ...... *G01P 13/02* (2013.01); *B63B 2017/0054* (2013.01)

(56) References Cited

U.S. PATENT DOCUMENTS

| | | | |
|---|---|---|---|
| 4,488,431 A | 12/1984 | Miga | |
| 5,218,865 A * | 6/1993 | Djorup | G01P 5/12 73/170.12 |
| 5,357,795 A * | 10/1994 | Djorup | G01P 5/01 73/170.12 |
| 5,918,276 A | 6/1999 | Grindle et al. | |
| 6,257,074 B1 | 7/2001 | Kellerman | |
| 7,385,304 B1 * | 6/2008 | Wohlert | F03D 1/065 290/44 |
| 8,135,504 B2 | 3/2012 | Summers | |
| 2005/0034516 A1 * | 2/2005 | Yoshida | G01P 5/06 73/170.01 |
| 2007/0046480 A1 * | 3/2007 | Stein | G01P 5/07 340/601 |
| 2011/0000314 A1 * | 1/2011 | Georgakopoulos | G01P 5/07 73/861.85 |
| 2012/0266692 A1 * | 10/2012 | Hong | G01P 5/06 73/861.85 |
| 2015/0153373 A1 * | 6/2015 | Jones | G01P 5/06 73/861.85 |

OTHER PUBLICATIONS

Raymarine Inc., "Raymarine Instrument Transducer Options" Raymarine A Series Transducers, pp. 1-18, viewed May 24, 2013 (Dec. 15, 2015) http://www.raymarine.com/view/?id=1479&collectionid=8&col=1484.

Nexus Marine—Passion for Performance "nWind Transducer", pp. 1-5, viewed May 24, 2013 (Dec. 15, 2015) http://www.nexusmarine.se/products/marine-instruments/transducers/nwind-transducer/.

Olin Sailbot Robotic Sailing Team, Olin College of Engineering, Needham, Massachusetts, USA, "Unfiltering the wind sensor" pp. 1-8, posted Apr. 9, 2012, https://olinrobolicsailing.wordpress.com/2012/04/09/unfiltering-tha-wind-sansor/.

Pederson, et al., Expert Group Study on Recommended Practices for Wind Turbine Testing and Evaluation, "11. Wind Speed Measurement and Use of Cup Anemometry" International Energy Agency Programme for Research and Development on Wind Energy Conversion Systems (IEA Wind), pp. 1-60, 1999.

Airmar Technology Corporation, Brochure "PB200", pp. 1-4, Jan. 12, 20111, www.airmartechnology.com/uploads/brochures/pb200.pdf.

Pedersen, T. F. et al., Riso National Laboratory, Technical University of Denmark. "Wind Turbine Power Performance Verification in Complex Terrain and Wind Farms", pp. 1-60, Apr. 2002.

Adolf Thies GmbH & Co. KG, "Thies Anemometer First Class Advanced" product specification sheet (May 16, 2012 version), Gottingen, Germany, pp. 1-5, Dec. 22, 2008, www.ammonit.com/images/stories/download-pdfs/TestReports/en_dtwindguard_cupanemometerclass_122008.pdf.

\* cited by examiner

WIRELESS IMMERSIBLE ANEMOMETER FOR SAILBOATS

RELATED APPLICATION

This application claims the benefit from International Application No. PCT/CA2014/000416, filed May 9, 2014, which in turn claims priority to U.S. Provisional Patent Application having Ser. No. 61/927,757, filed on Jan. 15, 2014, and U.S. Provisional Patent Application having Ser. No. 61/836,870, filed Jun. 19, 2013, all of which are incorporated herein by reference in their entireties.

FIELD OF THE INVENTION

The machine disclosed here concerns wind sensing for sailboat navigation. Most anemometers become less accurate the more they are tilted, which is the way sailboats normally sail. Unlike propeller, ultrasonic and cup anemometers, the anemometer disclosed here responds accurately to wind speed and direction whether upright or tilted even as far as horizontal. The invention can also be installed at the masthead without climbing up or lowering the mast.

BACKGROUND OF THE INVENTION

The following publications are referenced herein:
1. U.S. Pat. No. 6,257,074 to Kellerman;
2. U.S. Pat. No. 8,135,504 to Summers;
3. Armagh Observatory web page, "Cup-anemometer by Munro 1870", viewed Apr. 8, 2013 at www.arm.ac.uk/history/instruments/Robinson-cup-anemometer.html;
4. Raymarine Inc., "Raymarine Instrument Transducer Options", viewed May 24, 2013 at http://www.raymarine.com/view/?id=1479&collectionid=8&col=1484;
5. Garmin Stockholm AB web page, "nWind Transducer", viewed May 24, 2013 at www.nexusmarine.se/products/marine-instruments/transducers/nwind-transducer/;
6. Olin Sailbot Robotic Sailing Team, Olin College of Engineering, Needham, Mass., USA, viewed May 23, 2013 at www.olinsailbot.com/2012/04/09/unfiltering-the-wind-sensor/;
7. Expert Group Study on Recommended Practices for Wind Turbine Testing and Evaluation (1999), "11. Wind Speed Measurement and Use of Cup Anemometry", International Energy Agency Programme for Research and Development on Wind Energy Conversion Systems (IEA Wind), viewed Apr. 8, 2013 at www.ieawind.org/task_11/recommended_pract/11_Anemometry.pdf;
8. Airmar Technology Corporation brochure "PB200", obtained online in PDF format on Jan. 19, 2011 and May 23, 2013 at www.airmartechnology.com/uploads/brochures/pb200.pdf;
9. Pedersen, T. F. et al. (2002). Riso National Laboratory, Technical University of Denmark. "Wind Turbine Power Performance Verification in Complex Terrain and Wind Farms", viewed May 24, 2013 at http://orbit.dtu.dk/fedora/objects/orbit:91603/datastreams/file_7726871/content; and
10. Adolf Thies GmbH & Co. KG, "Thies Anemometer First Class Advanced" product specification sheet (May 16 2012 version), Gottingen, Germany, viewed Apr. 8, 2013 at www.ammonit.com/images/stories/download-pdfs/TestReports/en_dtwindguard_cupanemometerclass_122008.pdf.

One of the fundamental challenges with sailboat navigation is that sailors need a method of determining the headings, times and distances for their possible routes and optimal tacks. The United States of America patent by Summers (U.S. Pat. No. 8,135,504) defined a way to quickly and easily calculate these tacking results, although it works best if the tacking calculations can be continually updated with real-time wind data. Although these calculations are available worldwide in mobile apps, there are few anemometers available that can transmit wind data to mobile devices, no mounted anemometers available that are immersible if a small sailboat flips, and no anemometer that works equally accurately when heeling over while sailing.

The main sensors or anemometers for measuring wind speed are propellers, impellers in a tube, cups that move from the force of the wind, and more recent ultrasonic sensors. Wind arrows are added for sensing wind direction, or that turn the impeller into the wind. The original Robinson 4-cup anemometer was installed at the Armagh Observatory in Ireland in 1846. The cup sensor used an existing technology of the day, a mechanical clockworks to record the number of cup rotations in a time period on a rotating drum. But other than favoring 3 cups now, and replacing the drum with electronics to record and display the wind speeds, cup anemometers have been largely unchanged in over 150 years.

Handheld anemometers such as the one patented in the United States of America by Kellerman in 2001 (U.S. Pat. No. 6,257,074) are popular. This is an example of an anemometer with an impeller inside a short tube. However, handheld anemometers do not provide continuous read-outs, since they are designed to be handheld rather than mounted, and thus checked occasionally by holding them up into the wind. They typically do not include a wind direction arrow, only an impeller for wind speed. It is also very difficult on a small handheld anemometer to know if you are aiming it directly into the wind to get an accurate reading. Also, sailors need their hands free for handling ropes, sails and the tiller or wheel.

A number of styles of mounted anemometers are available, with cups, propellers or ultrasonic sensors with no moving parts. One problem is that these are generally designed to be water-resistant when upright, but not designed for use on small sailboats, which flip and could therefore submerge the anemometer mounted at the masthead. More importantly, there do not appear to be any anemometers that are invariant to tilt of the sailboat; they all become increasingly inaccurate the more a sailboat heels over while actually sailing (exactly when they are needed).

For example, Raymarine has several models of cup anemometers—Rotavecta, ST60 and TackTick—all of which use traditional half-sphere cups which face the wind less and less the more the sailboat heels over when sailing. The same appears to be true for the propeller blades on the Garmin/Nexus Wind Transducer. All 3 blades turn in the wind when their axis is horizontal, although when the sailboat heels over, one of them has to move into the wind and is not cupped to reduce wind resistance. This would be like expecting a 3-bladed propeller on a small airplane to rotate when the wind is from the side; it is only designed to catch the wind along the axis of its rotation. The Garmin/Nexus twin wind direction arrows also contain large flat surfaces that simply block the wind as they become more vertical when the sailboat heels over. Like all propeller anemometers, the Garmin/Nexus also only gives accurate wind speed after it has turned into the wind; it does not work with wind from any direction, as a cup anemometer does.

Ultrasonic anemometers have no moving parts. They transmit sounds above the range of human hearing in several different directions and measure the arrival time to infer the direction and speed of the wind. However, the sound waves are affected by air temperature and precipitation. The highly-promoted Airmar brand appears to have a response lag of 10 seconds to any wind shift—which many sailors would find too slow—because the wind data is buffered and averaged, according to a study at Olin College of Engineering. More importantly, the shape of the sensing heads can interfere with wind flow. Even when upright, this wind flow distortion can produce wind speed errors in sonic anemometers, according to the Expert Group Study on Recommended Practices for Wind Turbine Testing and Evaluation. But more importantly for sailors, since sailboats heel over when under sail, ultrasonic anemometers like the Airmar contain a thin horizontal slot for the wind to pass through. As the boat heels over, the base of the unit itself obstructs this slot. An Airmar brochure notes that the upper limit for accuracy is 30 degrees of tilt, although it does not say how much accuracy has dropped off by this point.

Those skilled in the art will know that there is a body of research particularly from assessing wind farm turbines, showing that as an anemometer tilts (or the wind approaches the anemometer on a vertical angle), the reported wind speed falls off in an accelerating manner the more the vertical angle increases. This error function is like a bell shape, with the best accuracy when the anemometer is upright, and an accelerating drop in accuracy with tilt toward or away from the wind. The research typically shows that the drop-off follows a cosine curve, with increasingly worse sensitivity to wind speed as the angle increases in equal steps. This kind of response function occurs in all anemometers presently in use in marine environments, and has been documented by Riso National Laboratory—Denmark (2002), and for example the Expert Group Study on Recommended Practices for Wind Turbine testing and Evaluation (1999). The specification sheet for the Thies Anemometer First Class Advanced provides good documentation on its response characteristics, and shows the same drop in accuracy as the anemometer leans away from the wind up to 35 degrees, closely following a cosine curve.

This response function is a problem for anemometers used in sailboats, which may heel at 30 degrees or more when under sail. All types of sailing—recreational, long-distance cruising, and elite racing—requires accurate wind information for navigation. However, there is little awareness of this lack of accuracy in wind sensors when sailing, and no apparent solutions available. Sailors go to great lengths to improve the precision and efficiency of their equipment. But if basic measures of wind speed and wind direction are not accurate whenever a sailboat heels (i.e. most of the time), then tacking calculations and route planning will not be accurate.

Although wind is obviously important for sailboats, and cup anemometers are the most common type on sailboats, the cup anemometer design was made for the roof of the Armagh Observatory in the 19th Century, not for sailboats, which by their nature lean over (or "heel"). Rather than spinning the cups faster when the wind heels the sailboat over on its side, this transfers the force up the axle. A solution is needed that is designed for sailing, so that the cups continue to spin with the same accuracy when the boat is upright or heeling.

A further problem with the state of the art is that there are no mounted, full-featured anemometers available for small sailboats, because these devices are not waterproof and durable enough for the flips that small sailboats sometimes experience in wind gusts. Also, marine electronics have only been for large sailboats, even though mobile devices like smartphones and tablets now have full chartplotting capabilities and are ubiquitous worldwide now. It is easy to have a waterproof container or dry bag for a mobile device, which now support advanced navigation functions, so it would make sense to give small boat sailors the same functions available on large boats.

Most marine anemometers have a further limitation with horizontal arms and surfaces. These make attractive perches for birds. This may damage the wind sensor, especially with the weight of a bird as large as a seagull, crow or eagle. Bird droppings may also interfere with the unit's functioning and solar panels.

A further disadvantage of the state of the art is configuring multiple axes of rotation, for allowing the wind cup and wind direction arrow to spin independently, while also allowing side-to-side movement on a gimbal if there is a need to keep the vane upright. It is tricky to find a way to mount three different bearings and axles in a compact form. One solution is to use a rod-end bearing, which offers rotation and also tilting back and forth. However, although this and other bearings typically allow tilt for misalignment in mechanical components up to 30 degrees, sailboats can heel farther than this. Putting three bearings in a wind vane may also add weight. It is also difficult to find maintenance-free bearings, which would be best for using the vane at the top of a sailboat mast. A method or machine is needed for equally accurate wind sensing with any amount of tilt in the sailboat.

There is also a problem with the standard use of 360-degree potentiometers to provide voltage resistance changes to represent wind direction. These mechanisms have a transition point sometimes referred to as a "dead band", where resistance must change from lowest resistance to highest resistance, to start the rotation over again. But in this zone, there is no sensitivity, and read-outs may be of wind directions nearby.

A further limitation with the state of the art is that wind direction arrows may also become less accurate when sailboats are heeling over while sailing. When a wind arrow on an anemometer is tilted by 30 to 40 degrees or more, it begins to point vertically, not into the wind. Those skilled in the art will know that the standard procedure for all anemometers is to mount them and calibrate the arrow when the boat is upright, setting the arrow on its axis with the arrow pointing to the front of the boat or to North. But even if the wind direction is constant, the arrow may not aim in the same direction when the boat is heeled over while sailing. The distortion is also a function of wind angle, because a 90-degree wind angle off the beam will not affect the wind arrow direction as the wind arrow leans away, even though a 45 or 135-degree wind angle will. This is not an effect of gravity pulling on the tail of the wind arrow, but simply that the direction of the wind arrow may change as its orientation leans sideways. This needs to be accounted for to obtain accurate wind direction readings, and for the navigator to obtain accurate results for optimal tacks and Tacking Time to Destination. But there seems to be little awareness of this issue, no solutions available, and little research to document it (perhaps because it is more of a problem in sailing than in wind power generation farms).

A further limitation with anemometers commonly used on sailboats is that they need to be calibrated for wind direction. Since boats can move, North is not always in the same direction, so a common procedure is the calibrate the anemometer relative to the bow of the sailboat. Then when the boat is moving and its GPS heading (or compass heading) is known, the wind angle is available, and the wind direction can be derived. Unfortunately, a further disadvantage of existing anemometers is that it is impossible to calibrate them on high-tech rotating masts. Those skilled in the art will know that some modern performance sailboats have a mast that rotates when the sail moves across the boat on port and starboard tacks. But if the mast rotates with the sail, and the anemometer is mounted at the top of the mast, the anemometer cannot be calibrated with the bow of the boat (since the anemometer will rotate back and forth on the mast).

There is also a problem with wiring of anemometers on sailboats. Installing wiring for an anemometer down from the top of a mast of 50 feet or more, through the walls and floor of a sailboat is expensive, difficult and dangerous. Since boats are subject to harsh environmental conditions like tropical sun, and to constant movement, wiring (and even heavy rope) also tends to chafe unexpectedly fast. Installing 50 feet of wiring down the inside of an aluminum mast also adds weight above the boat's center of gravity, and causes annoying noise from the wire banging around inside the long metal hollow mast.

There is a further problem with wiring connections within the anemometer itself. Circuit board electronics have a common problem in marine electronics of all kinds, in that they are exposed to air even if inside a waterproof housing. Air can have moisture in it, which may cause frost or condensation during temperature changes. It would be better if a way could be found to surround the circuit board inside the waterproof housing with dry nitrogen or some other substance to avoid moisture problems in air around the circuit board.

A further problem with installing wiring at the top of a mast is that it is sometimes actually easier to lower all of the rigging and a long mast, than to try to raise someone high above the deck in a "bosun's chair" with power tools, to mount an anemometer. But bringing the mast down is awkward and expensive, and requires a crane for most keelboats. Putting the anemometer on a stern rail is possible, but wind is not as clean there. A better method or machine is needed for getting the wind vane to the top of the mast.

Finally, even if a wireless anemometer is used at the top of the sailboat mast, there are still problems for receiving and displaying the data. What if the user doesn't have a compatible mobile app, or a device that supports apps? There are also limitations if the user has marine electronics like a GPS chartplotter on which they want to display wind data and tacking results, but there is no way to get the wireless signal into the chartplotter.

A machine that could solve these problems would be very useful.

SUMMARY OF THE INVENTION

The object of the present invention is to overcome the above shortcomings with a novel new machine that improves on the state of the art for anemometers used in sailing. It is not obvious how to design anemometer blades that maintain equal accuracy with different vertical wind angles as the sailboat heels over. For sailors, such a device would be a substantial improvement over existing anemometers. Every model currently available loses accuracy when sailboats heel, which is a common event on sailboats. Some also need to be aimed directly into the wind to get wind speed, which further affects accuracy. Inventive steps are disclosed here to address these problems, with an anemometer designed to work better, and be easier to install and calibrate on sailboats of all sizes. Getting more accurate information on wind speed and direction is very important, because if the accuracy of the wind speed and direction decreases when a sailboat heels, this affects its navigation, introducing error into calculations of the optimal tacks and the Tacking Time to Destination done manually or calculated automatically within electronics.

These objectives are achieved by the present invention, which is designed to allow the wind cups to respond equally well whether upright or tilted. The improved design recognizes that the tilting is asymmetric. Sailboats rarely sail leaning into the wind, only away from the wind. This causes upward force on anemometer cups or blades, as the wind angle moves lower on the on the cup when it tilts back away from the wind. Some of the energy is then directed into pushing up the axle, rather than for rotating the cups.

In accordance with the objectives of the present invention, a gimbal or hinge is one inventive step to allow more accurate wind sensing with standard cups or impellers. This involves a bearing oriented front to back in a boat, to allow the anemometer's cups and wind arrow to rotate to stay upright when the boat heels to port or starboard.

Also in accordance with the objectives of the present invention, an inclinometer can be used to index the amount of heel (the amount the sailboat is tilting or leaning over sideways in the wind), so as to correct the wind values reported, knowing that the common reduction with heel is based on a cosine function. This could also work with standard cups, blades or impellers. Any effects of tilt on the wind speed cups or wind direction arrow can then be offset in software, by calibrating at different amounts of tilt and wind angle with constant wind speed and direction, and letting software on the circuit board or in a receiving device correct the wind data that is displayed by adding the offsetting amount of distortion based on the amount of tilt and wind angle.

In accordance with the objectives of the present invention, the apparatus also involves cups or blades that catch wind and rotate equally well when tilted. Rather than adding extra moving hinges or extra software calculations, a blade that will respond to wind force from the side or below is an inventive step that solves the problem experienced with all anemometers currently used on sailboats worldwide, of becoming less accurate when under sail. In standard anemometers, the lower part of the blade increasingly obstructs the cup, the more it tilts back. An object of the present invention is to overcome this shortcoming by using a cup-blade shape that functions like anemometer cups when upright, but with the bottom of the cups cut away so that they respond like a propeller when leaning back with the wind force coming from below. Cup anemometers are designed with the axle perpendicular to the wind, whereas propellers have the axle parallel to the wind direction. Anemometer cups catch the wind on one side of the rotating axis, but then create drag when coming around the other side. Propellers are different because all of their blades respond to the wind at once. Cup anemometers also respond to wind from any direction on the plane of the rotating cups, whereas propeller and impeller anemometers are only accurate when turned into the wind.

The orientation and curve of the cup blades can be adjusted to ensure that equal wind force is harnessed regardless of whether the boat is upright or leaning back. The blade shape disclosed here was obtained by testing the force on the cups, then cutting away the bottom part of the cups, which was not contributing any wind force to the rotation. The blades to be disclosed here were also tested with an open trailing edge like a curved wing, and closed against a central pillar like cups to add more strength. A further inventive step is that the arms can optionally be removed, pulling the cups in around a central vertical pillar as a stronger more unified object with no horizontal parts for birds to land on. The machine may be harder to start with no arms, but vertical lower blade extensions can help to offset this. The cup design disclosed here actually has the unexpected result that it accelerates the more the sailboat tilts. So pulling in the arms to speed upright rotation can help to offset the effects of tilt. Removing the arms also has the unexpected result that this design creates more, faster rotation than standard cup anemometers. Keeping the materials thin and light with no unnecessary filler is also an important characteristic of the invention disclosed here, which is consistent with the common observation that 3 blades work better than 4. It allows the blades to be responsive without needing to make them larger.

Small sailboats have never been able to have mounted anemometers or marine electronics in the past, because these boats can flip in wind gusts, which could break lightweight hardware and cause water damage to expensive electronics. However, in addition to strengthening the cups by optionally pulling them in with no arms, the entire apparatus disclosed here is waterproof. The circuit board will be mounted in the tail of the wind direction arrow, and completely encapsulated in clear durable material, to prevent any problems with moisture or condensation in the air around the circuit board, or water leakage. A waterproof potentiometer is used with the wind cup blades for sensing the wind speed, which is also submersible, allowing the invention disclosed here to be suitable for use detecting wind speed and direction in sailboats large and small. Because the invention is wireless along with being sturdy and immersible, it can send data to a smartphone, tablet or other mobile device (or computer or marine electronics, on larger boats), thereby providing advanced navigation data even on small sailboats.

With the inventive step of encapsulating the circuit board and all electronics inside a clear durable coating like epoxy, urethane or acrylic sealant to form the wind direction blade, sunlight can pass through to charge the solar panels, and any LCD display or blinking LED lights can be observed. The encapsulation material can also be UV resistant, so that it is itself protected from sun damage or discoloration, and protects the components and circuit board inside. A potting or encapsulation material is selected that does not interfere with radio transmissions from the circuit board inside. The encapsulation material forms the housing for the circuit board and wind arrow, without needing to mold or construct a wind arrow or attempt to build a waterproof housing. The circuit board and wind direction arrow are therefore solid and sturdy. It doesn't matter if the circuit board is thicker than many wind direction arrows, as long as it has flat sides that turn away from the wind. By being directly exposed to the air and wind, the encapsulation material may actually dissipate heat better than a hollow sealed enclosure.

A further object with the clear encapsulation material is that it allows the use of an LCD screen mounted on the circuit board inside the wind arrow blade. If the device is being used handheld rather than in its usual position mounted at the top of a sailboat mast, the wind speed and direction could be displayed on the LCD screen. If the user holds the assembly in front of them facing into the wind, the wind direction blade would swing back towards the user, allowing them to easily read the wind speed and wind direction. Most impeller handheld anemometers do not have a wind direction arrow, which is an important advantage with the invention disclosed here when used handheld. A further problem with impeller handheld anemometers is that there is no way to tell if you are aiming the impeller tube precisely into the wind, to get accurate wind speed readings. With the cup blades of the present invention, they spin equally well regardless of the wind direction.

Another inventive step is the ability to measure both wind speed and wind direction with only one potentiometer or encoder. Ordinarily two potentiometers or encoders are used on a standard anemometer, one for the wind speed and one for the wind direction. The present invention contains a further inventive step using only one potentiometer (for the wind speed cups), which is mounted directly on the circuit board. As noted in the Background, there is usually a problem with the dead band for voltage transitions, when using a potentiometer to detect wind direction. This second encoder or potentiometer for wind direction also needs to be calibrated, and is not compatible with sailboats having rotating masts. A novel aspect of the present invention is therefore to mount a fluxgate compass module directly on the wind direction arrow and the circuit board inside. Ordinarily the circuit board and fluxgate compass would be stationary and separate from the wind arrow, and the arrow would need to be calibrated to them. There is also no external wiring at all this way; no wiring to install down the mast, and no wires to chafe and short out even on the unit itself. All of the electronics are mounted and encapsulated on the circuit board, including the solar panels, batteries, LED lights, LCD display, and the contacts of the waterproof potentiometer for the wind speed cup/blades.

This means that the wind cups are actually mounted on the wind direction arrow. As those skilled in the art will know, the potentiometer or encoder signals the number of rotations in a given time period to derive the wind speed. The wind cups may rotate many times per minute, whereas the wind direction arrow typically will move but not rotate at all, making it possible to measure from each independently. If the spinning of the wind cups affects the movement of the wind direction arrow, this could be corrected in the firmware on the circuit board by assessing and accounting for the amount of distortion at different wind speeds. One or more bearings are still needed with the wind direction arrow, so that it can rotate around the vertical rod. As shown in FIG. 5, the axis of rotation for the wind speed cups and wind direction arrow can be aligned one above the other, but mounted separately.

Although only one potentiometer is required in this design, it has a further advantage over some wind speed sensors. Rather than a potentiometer or encoder per se, some anemometers count revolutions to measure wind speed using a magnetic sensor or switch. The sensor may be mounted at the base of the axel, with a magnet attached to the wind cups. Every time the magnet passes the sensor during a complete revolution, it triggers a signal to detect the speed of revolutions and therefore the wind speed. Unfortunately, this design has several drawbacks. If the cups are not moved close enough on the axel, the magnet is not detected, resulting in imprecise wind speed readings. Also, the magnet introduces a lop-sided weight onto the fast-spinning wind speed blades, which introduces vibration. The sensor may also be on an exposed circuit board, rather than a sealed housing of a potentiometer. By using a sealed potentiometer, the present invention allows operation and sensing that is smoother, more durable and more reliable and precise.

Anemometers don't work on sailboats if they are still in the box. But often anemometers cannot be installed on sailboats until arrangements are made to disassemble and lower the mast, or to send someone up the mast on a rope and bosun's chair, both of which are inconvenient, expensive, difficult operations requiring multiple people to help. A further inventive step of the wind machine disclosed here is to be able to mount it at the top of a sailboat mast, without needing to go up the mast or lower the mast. There has been little if any attention given to solutions to this problem, because until recently all anemometers have needed wiring to be installed inside the mast and run through the cabin walls of the sailboat to the cockpit. But a wireless anemometer opens an amazing new opportunity, to mount the unit at the masthead remotely. This would allow the anemometer to be removed in hurricanes or for inspection, and would increase convenience and lower costs. Ironically, there is already an existing method of getting an anemometer to the top of a mast, although it has never been used for this purpose before: the mainsail mast track. It goes to the top of a mast, and has a rope (called the halyard) and pulley pre-installed, that is ordinarily used by the main sail. There may be a few inches of space at the top of a mast above the sail. The sail runs along the mast track in slider cars. Even if there is not space above the sail, main sails generally have a solid plate on the top corner of the sail, and no slider car attached for about the top 4 inches of the sail. If a flat mount was slid up the mast track to support the anemometer, the halyard and top corner of the mainsail could pass over the center of it, and it would not interfere with raising or use of the main sail.

A further inventive step is to provide "quick release" levers on the vertical rod of the anemometer. When the boat is being put into storage or on/off a trailer, this would allow the anemometer to be quickly put on/off the masthead without tools. This is advantageous since there is often a lot of confusion and tangled rigging when the mast is lowered/raised. The quick release allows the anemometer disclosed here to be used with several different mounts, and joined or removed from any of them: a mounting base as in FIG. 7 for screwing to the top of the mast (or to a horizontal extension bar extending out from the masthead), to a plate for sliding up the mainsail track (FIG. 6), or with Adel clamps on a pole, wall or sailboat stanchion (FIG. 8). Adel clamps are small loops of metal band to go around a pipe, tube or rod.

The invention disclosed here provides its own indefinite source of solar power, which is stored in the lithium battery power system. Although power supplies like lithium batteries may change in future, the particular type of battery does not limit the scope and inventive steps of the machine described. There is an ultra low-power micro-controller for collecting and transmitting the wind data. To talk to other devices, the invention wakes up periodically (e.g, every 8 seconds) to check if a user is waiting for wind data, and then goes back to sleep to save power. It only sends out continuous radio reports if another device has been detected. Then, it stays awake (active) but transmits for just a few milliseconds each time to save power. If the receiver is switched off, the Wind Vane will continue to transmit for 3 minutes, in the hope that the receiver will reply back. But if no response is received, the Wind Vane will then go into sleep mode. Wind information reports will be made frequently if the wind information is changing. If the wind information is not changing, a report will be transmitted every 20 seconds to preserve power while ensuring that the receiver remains active. These time intervals and parameters could be adjusted without departing from the spirit and scope of the invention.

In accordance with the objectives of the present invention, the data that is transmitted should be receivable on as many different types of mobile devices, marine electronics, e-readers and computers as possible. Although e-readers may become obsolete as smartphones and tablets continue to become more widespread, lower cost and multi-purpose e-readers can currently play an important role in marine navigation, even if unintentional. They are low cost, their batteries last for weeks, they are easy to view outside, and they have wifi. If the anemometer with solar panels is unable to generate enough power for a transmission format such as wifi that is used by devices such as e-readers, another object of the present invention is to add an accessory box that can receive the data from the wireless anemometer, convert it to a common format like wifi and transmit to e-readers and other receivers with power from built-in wiring or batteries.

Along with power wires in an optional accessory box, a further object of the invention is to include an accessory box with wiring ports for NMEA on-board networks. As those skilled in the art will know, NMEA is an industry-standard data format for marine electronics from the National Marine Electronics Association. However, most of the major manufacturers have not supported this industry standard in their wireless products, only in wired marine electronics networks. Having an NMEA wiring port on the accessory box would therefore allow a user who has wired marine electronics to receive the wireless data on the accessory box, which then sends the data in an industry-standard format into the wired on-board network. Those skilled in the art will know that wind data can be represented in standard formats like NMEA 0183, NMEA 2000 or even html or other formats. As those skilled in the art will also know, html is the standard format for web pages, which stands for HyperText Mark-up Language.

In accordance with the further objectives of the present invention, the apparatus can also include software on the circuit board (called firmware) that does navigation calculations, beyond transmitting wind speed, wind direction and battery level. The patent by Summers (U.S. Pat. No. 8,135, 504) is for a method of entering information such as the directions of the wind and a destination, to then calculate the optimal tacking angles. If additional information is provided such as the boat's hullspeed or length at the waterline, the distance to the destination, and/or the wind speed, full tacking results can be calculated including the headings, distances and time on each tack. The software can then also recommend the optimal tacks based on the boat's performance, the wind conditions, and the location of the destination. Those calculations have been previously done on a microchip in other GPS products. Hence it will be apparent to those skilled in the art that the calculations could also be done on the microprocessor in the wireless anemometer disclosed here.

In accordance with the objectives of the present invention, information that is calculated in the firmware on the circuit board could be transmitted wirelessly in a number of different data formats, such as text, NMEA format for marine electronics, html, or other data formats for wireless devices that talk to each other. It would be typical to receive this data into a chartplotter navigation app on a mobile device like a smartphone or tablet, or into a computer running a chartplotter program, or into marine electronics such as a wireless receiver on an on-board network with a GPS, autopilot and other instruments such as radar. Those skilled in the art will realize that a variety of wireless standards could be used for this kind of radio transmission, including wifi, Bluetooth, Bluetooth Low Energy (also known as Bluetooth 4 or Bluetooth Smart), or radio signals such as with a 2.4 GHz wireless remote control (such as for a wireless car key or garage door opener).

However, there are a large number of other devices such as e-book readers that currently cannot run apps or receive NMEA data even though they have wireless capabilities such as wife. Many of these devices do have a web browser and wireless capabilities. Therefore, a further inventive step disclosed here is to transmit data on wind or tacking results from the anemometer in html format, effectively using the microprocessor on the circuit board (or a base unit) as a web server. That allows the data to be received on a wide range of wireless devices that have web browsers, even if the device does not support NMEA for marine electronics or support a particular app.

Further objects and advantages of the present invention will be apparent from the descriptions in the following sections wherein preferred embodiments of the invention are shown.

DETAILED DESCRIPTION OF THE INVENTION

Figure 1:
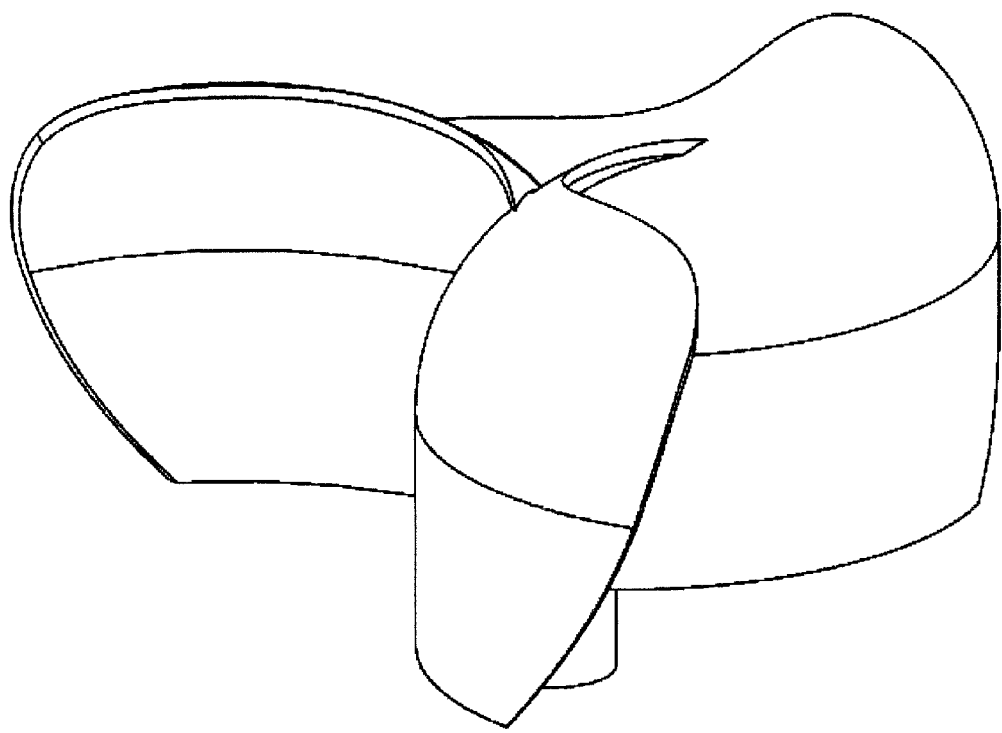
FIG. 1: Structure of wind cup blades in diagonal view from above, showing concave curve at top of blade and upper structural connection in the center onto the next blade.
Figure 2:
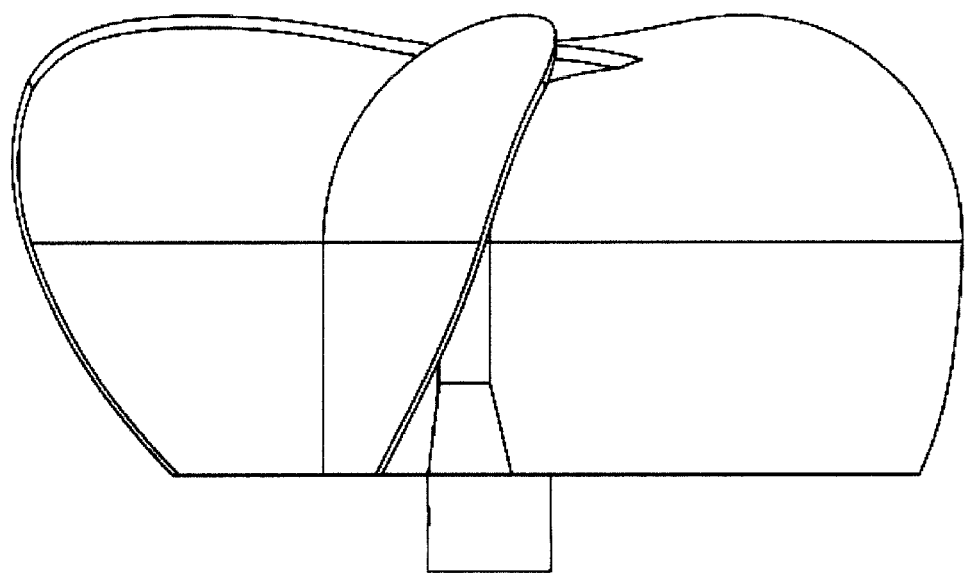
FIG. 2: Side view of wind cup blades showing vertical lower surface.
Figure 3:
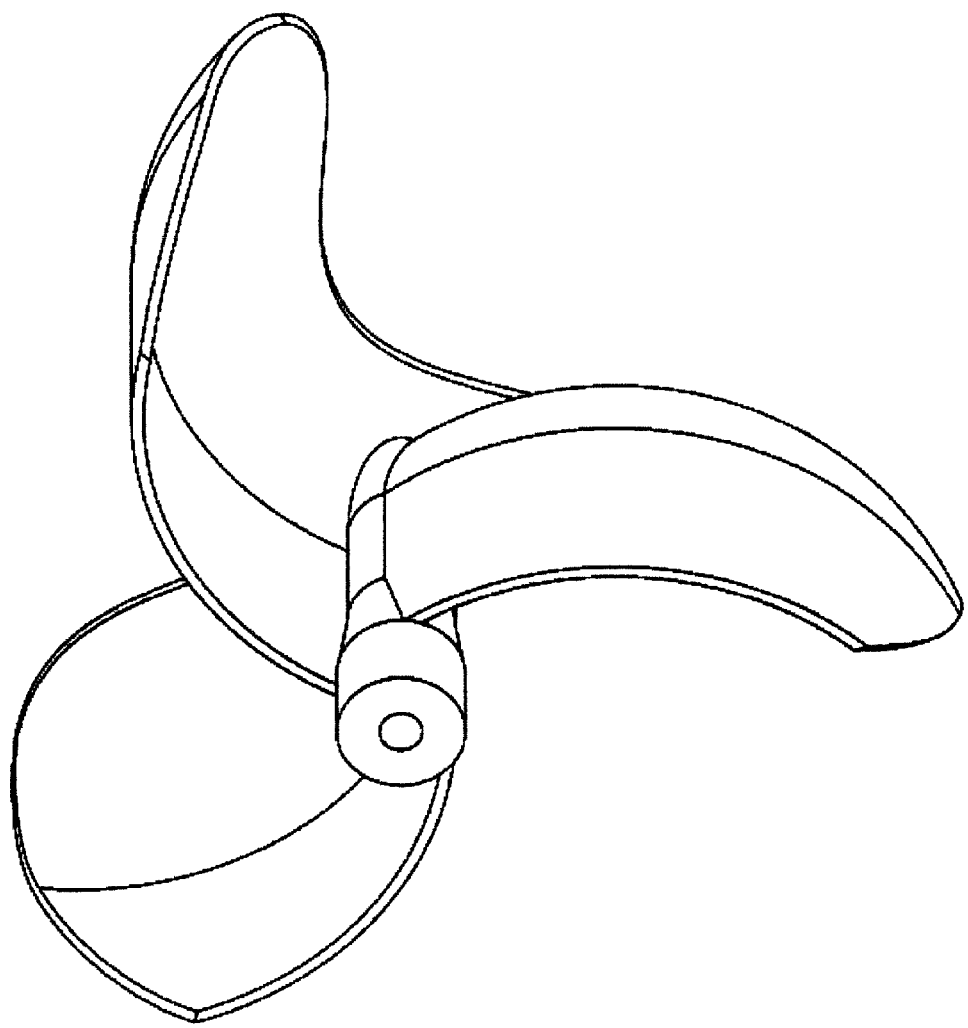
FIG. 3: Diagonal view from below of structure of wind cup blades and mounting hole for axle.

The machine disclosed here provides novel solutions for a number of problems for wind sensing in sailboats. In the most basic embodiment, this wind sensor is a wireless "appcessory"; a hardware peripheral for mobile apps, intended to transmit accurate data on wind speed, wind direction and battery power on sailboats of all sizes regardless of the amount of heeling. In an alternate embodiment, it can also send tacking information and can operate as a web server, sending wind and tacking information to any wireless device with a web browser. An alternate embodiment can also have a port for wiring to NMEA, ethernet or other onboard networks.

In the past, it has been difficult to provide enough electricity from small solar panels to power wireless transmissions. But Bluetooth Low Energy is one transmission format that is now suitable for transmitting directly from the sensor, with no need to send a low-powered radio signal to a base unit. Using a low-power transmitter allows small solar panels to provide enough power to support transmissions that work with mobile devices such as smartphones and tablets. This means that no base unit is needed with additional power. That provides a simpler final product for consumers, and halves the parts and manufacturing costs of the device, which is a major inventive step in the machine disclosed here. In the preferred embodiment, Bluetooth Low Energy transmissions are sent from the anemometer, with power generated by small solar panels, and other wireless formats such as wifi and standard Bluetooth available in an optional base unit accessory with a separate power supply.

Small sailboats have traditionally not had electronics like GPS chartplotters or anemometers, although that is changing with the explosive growth of smartphones and tablets worldwide. The wind sensor disclosed here is novel in being designed for sailboats, since standard anemometers lose accuracy when sailboats are heeling over under sail. But it is also novel in being submersible and suitable for use on a small sailboat, either handheld, or mounted and transmitting to a mobile device in a waterproof case. Small sailboats can flip in gusty winds, which is one of the main reasons that the invention disclosed here is advantageous, with its sturdy, lightweight waterproof design.

Regardless of the size of sailboat, in the preferred embodiment of the wind cups, the design shown in FIGS. 1, 2, 3 and 4 causes the axle to spin whether the sailboat is upright or heeled over away from the wind while under sail. In this preferred embodiment, the bottom of the traditional hemisphere anemometer cup is cut away so there is no surface to push upward on or create additional aerodynamic drag, when leaning away from the wind. The vertical lower portion of the cup catches the wind when the boat is upright. When the sailboat heels over with the wind, the concave curve or windward tilt of the upper part of the cup catches the wind. Therefore, the partial cups get pushed from the side, but function like a propeller when wind is from below when the sailboat heels. Unlike existing anemometers that slow down when the boat heels over, this design of cup anemometer blades has the novel and surprising characteristic that it actually accelerates when it tilts, unless tempered.

Although the blade shape begins with the upper part of a traditional hemispheric anemometer cup, in the preferred embodiment the cup blades are pulled in with an offset rotation point to adjust the openness of the blade face. Pulling the cups in to remove arms makes the assembly stronger, more compact and removes any horizontal parts for birds to land on. More importantly, although it may be slightly harder to get started in light winds without the leverage of arms (other things being equal), the rotation speeds are higher with no arms. However, in another embodiment the blades can be placed on arms, which provides more leverage and allows more of the cup to be exposed to the wind force. In a preferred embodiment, an odd number of cups is used to avoid symmetric offsetting forces on each side of the axle. More importantly, in a further preferred embodiment, the number of cups is limited to three to reduce weight, even though intuitively more cup blades would appear to catch more wind. So in the preferred embodiment with a lightweight cup-blade unit with no arms, only 3 blades and vertical walls at the bottom of each blade to catch wind when upright, it actually does start easily even in light winds.

Figure 4:
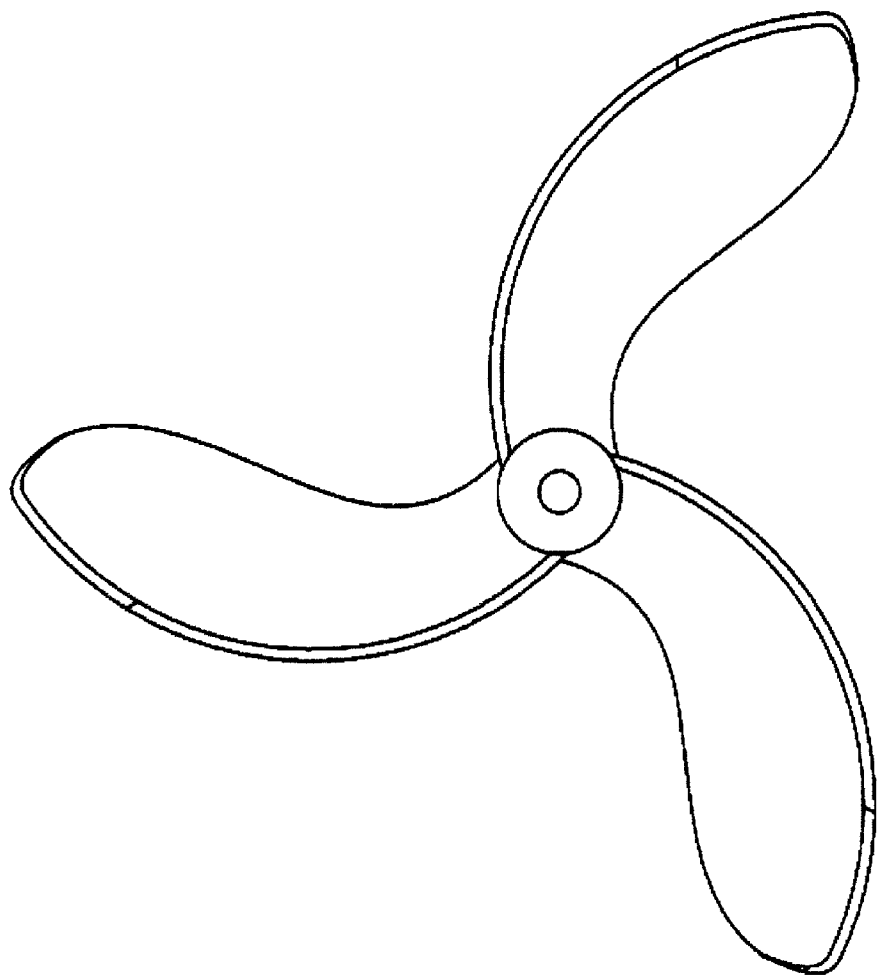
FIG. 4: From directly below, wind cup blades look like a propeller.

Along with the bottom of the cups, part of the outer edge is cut away, to give more of a propeller shape when the wind is from below, as shown in FIG. 4. In another embodiment, other blade shapes and tilts could also be used without diverging from the spirit and scope of the inventive step of the blade disclosed here: concave or tilted towards the wind on top and vertical below so that there are areas that are perpendicular to catch the wind whether upright or leaning back. The blade curve is "tuned" to spill or catch more wind to keep the response as constant as possible regardless of backward tilt angle. In the preferred embodiment, a vertical extension is added to the bottom of each blade, to allow it to catch wind more when upright, to help equalize the response regardless of tilt. Using lightweight small cups with vertical walls actually produces faster horizontal rotation speeds than standard plastic hemisphere wind cups.

With a traditional cup, propeller or ultrasonic anemometer, the farther a sailboat heels over close to horizontal, the less wind speed they detect. However, in the cup blades disclosed here, the sailboat could actually tilt all the way to horizontal, and the blades will continue to rotate in response to wind force. In another embodiment, we actually need to flatten the upper curve on the blade to spill some wind when the wind is from underneath, because all blades are then catching the wind and none are dragging back around in to the wind, which makes the blades even more effective. So the natural tendency of this design is novel compared to standard anemometers, since the blades disclosed here with a concave curve or tilt towards the wind at the top and a flat vertical surface at the bottom would ordinarily speed up as the tilt increases, even while the wind speed remains constant. A further inventive step is to add a ring or collar around the pillar below the wind cup blades. It could be thin like a plate, offering only a thin edge when the wind is coming horizontally. But with more tilt, the plate displays more surface area, blocking the wind as it approaches the cup blades. This is a further way to temper the tendency of these blades to accelerate with more tilt. The ring on the central pillar could act as a kind of brake, obstructing the wind more as the tilt increases. The size of the ring can be adjusted based on calibration tests with the cup blades, to temper the increase in rotation with more tilt, to maintain an equal rotation speed regardless of tilt.

In the preferred embodiment the back side of each blade is closed against a central pillar for strength. It catches the wind, but the wind does not need to pass over and exit on the trailing edge of the blade to create lift. In an alternate embodiment, the back edge of blades could also be left open, to let the wind pass over the leading and trailing edge. In the preferred embodiment there is also a connecting ridge extending forward onto the next blade at the top of each blade, as shown in FIG. 1. This adds strength and stiffness to the blades, which is also enhanced by the curved structure of the blades.

In an alternative embodiment, a gimbal or hinge is used to keep vane upright. In this embodiment, either traditional anemometer cups can be used, or the cup blades shown in FIGS. 1, 2, 3 and 4.

In an alternative embodiment, an inclinometer is used to index the amount of heel in the boat and to account for the drop-off in the wind sensor values reported. For any given wind speed, assuming the wind remains constant, the drop-off function can be determined. As noted in the Background section above, this has generally been found to be a cosine curve like a bell shape, so that if the wind speed remains constant, the reported wind speed increasingly drops as the anemometer is tilted more towards or away from the wind. If it is found that the reported wind speed drops off a certain amount with a certain amount of tilt and wind speed, this can be corrected when obtaining wind data while actually sailing, by adding the compensating amount for that amount of wind speed and tilt.

Figure 5:
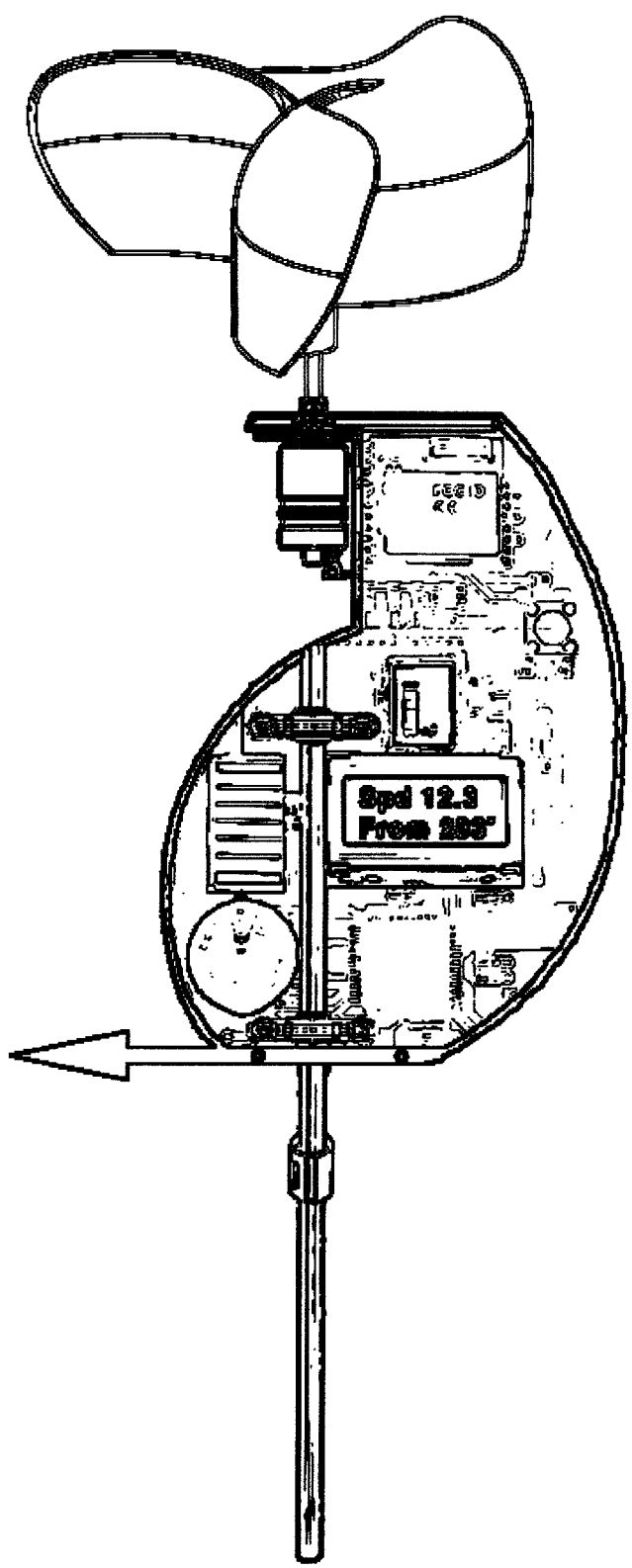
FIG. 5: Overall machine including blades for wind speed and wind direction on vertical rod.

In the preferred embodiment, the wind cups are mounted on the axle of a waterproof potentiometer or encoder that signals the number or rotations within a given time period to infer the wind speed. A perpendicular set-screw is used with a screwdriver or Allen key to tighten the wind cups on the axle. The potentiometer or encoder is mounted in a novel design directly onto the wind direction blade or arrow, as shown in FIG. 5. As the wind moves the wind arrow back and forth, the wind cups can continue to spin, with the number or rotations in a given time interval defining the wind speed. Software can be used to subtract the rotation of the wind arrow from the wind cups if necessary. However, it is unlikely that the wind direction arrow will rotate enough to interfere with the assessment of rotations of the wind cups for wind speed. This apparatus requires less space, and is similar to the watch and minute hands on a watch both being on the same axis.

In an alternate embodiment, the potentiometer or encoder for the wind cups is attached to a fixed circuit board which is attached to the vertical mounting rod. Rather than mounting the wind cups directly on the wind direction arrow, the wind direction arrow is also mounted on an axle and bearings protruding from the base holding the fixed circuit board. While still allowing all of the benefits of the invention such as continuing to work when tilted, this is a more traditional approach, with two rotating axles, one for wind speed and one for wind direction. The wind direction arrow could use an encoder/potentiometer to signal wind direction, or could use a digital compass.

In the preferred embodiment, the circuit board and electronics are encapsulated with a moldable material such as urethane to form the wind direction arrow and blade with no external wiring to chafe or install. This novel approach to providing a waterproof structure means that there is no need to construct a case or housing for the circuit board, or for the wind arrow. It also eliminates the difficulties of attempting to build a waterproof case that works. The encapsulation material is optically clear to allow light to pass through to the solar panels inside, and also UV resistant to protect the circuit board and internal components. There is no air inside, to avoid problems with condensation on the electronics. In the preferred embodiment, the potentiometer or encoder is soldered to the circuit board before placement in the encapsulation resin mold. Aside from functional advantages for the final user, this structural design also facilitates the molding of the encapsulation material around the circuit board. The threads on the bushing of the potentiometer extend above the circuit board, and can be used to hold the circuit board in place while the encapsulation material hardens, to both seal the circuit board with the potentiometer connectors but also structurally join them.

In the preferred embodiment, a fluxgate digital compass is mounted directly on the circuit board in the wind direction blade to determine wind direction. This avoids the use of an additional potentiometer with a dead band where the resistance changes at the end of the 360-degree rotation. A fluxgate compass also does not need to be calibrated when mounted on the boat, unlike standard plastic wind arrows that don't know which way they are facing. A fluxgate compass also works with rotating masts on modern sailboats. This novel design also eliminates the need for an encoder or potentiometer for wind direction, which helps to lower costs and remove moving parts that could eventually fail.

The overall design of the wind cups, wind direction arrow and other components is meant to be as light and small as possible. That makes it suitable for small sailboats, allows it to fit past the masthead if slid up the mast track, and creates less momentum or force when mounted and waving around in the wind and waves. That also allows the vertical support rod to be as thin as possible, such as 3/16 inch, if the anemometer is not too heavy (although this is not meant to limit the scope of the invention, which could also include thicker support rods that are solid or hollow). Although the preferred embodiment is to encapsulate the entire circuit board and use it as the wind direction arrow blade itself, those skilled in the art will know that the doming compound used to encapsulate and smooth the surface into its' own housing may make the blade relatively heavy. In an alternate embodiment, the circuit board can still be sealed within a thin conformal coating to protect it from all moisture, but rather than solid encapsulation a clear plastic housing could be used to provide less weight but the same function for the outer surface.

In the preferred embodiment, the structure is oriented vertically with the wind direction arrow below the wind cup blades, which have no arms. The distinctiveness of the machine is also enhanced by the use of clear encapsulation through which the circuit board and blinking lights can be seen. The preferred embodiment also uses a novel approach to the color of the wind speed blades, which seem to be always black in all cup, propeller and impeller anemometers. Our preferred embodiment uses the novel approach of a non-black color such as sky blue for the cup blades, since in the preferred embodiment with no arms their profile doesn't really change when they are spinning anyways. However, in other embodiments other colors including yellow and red are used for the plastic wind speed cup blades to emphasize the distinctive aspects of the invention, both for sailing in general regardless of heel and for use on small boats where the invention can be immersed if the boat suffers a knockdown in a wind gust.

In the preferred embodiment, the wind arrow rotates on one or more bearings around the mounting rod or pole. In one embodiment, the outer bearing race is clamped symmetrically to the circuit board with a shape like an Adel clamp. However in the preferred embodiment, the vertical rod goes through one or more waterproof, maintenance-free pillow block bearings attached to the circuit board. In this embodiment, the circuit board is thin and flat on one side, with the components on the other side where the pillow block bearing is also raised, so that the thickness of the circuit board is centered on the axis of rotation, when pointing into the wind. The wind direction arrow rotates around this axis of rotation when the tail is pushed by the wind. Although the tail alone could be used, in one embodiment a weight is used on the other side of the axis of rotation as a counterbalance. In the preferred embodiment shown in FIG. 5, part of the circuit board extends in front instead of a weight on the arrow head, to avoid adding an additional counterweight. This front part of the circuit board has electronics on it to offset the weight of the back side, but less area so that the back side gets pushed around by the wind. This means that when the sailboat heels, the wind arrow does not simply point up because of gravity pulling down on the tail. Instead, gravity pulls equally on each side. Then the directional pointing of the arrow even when tilted is from wind force, not gravity.

In a preferred embodiment, the wind direction arrow is calibrated at different amounts of tilt and wind angle relative to the bow of the boat, and software adjusts the wind direction that is displayed as a result of the bias. For example, when the wind angle is about 45 degrees off the bow, the more the boat heels over, the farther forward the wind direction arrow will appear to be, even if the wind direction remains constant—perhaps as much as 70 degrees if the sailboat is heeling beyond 45 degrees. In that case, to maintain equal accuracy in wind direction at all levels of tilt of the sailboat, the amount of distortion is noted in calibration testing, so that the observed reading can be corrected by adding an offsetting amount or percentage based on the wind angle and tilt. So the more degrees the boat heels, the greater a wind direction correction we add from 0 up to around 70 degrees based on the calibration. This is not necessary when the wind is from directly astern, since the boat does not heel then. It is also not necessary when the boat heels with the wind on the beam, since the wind arrow remains correct then. It is primarily necessary when beating into the wind, and to a lesser extent when the wind is off the stern quarter if that makes the boat heel—which can be calibrated for individual boats.

In the preferred embodiment, the arrow on the blade for wind direction points into the wind (as in FIG. 5). This is traditionally the way all anemometers and wind vanes work, with the pointer or arrow head on the wind vane swinging around to point into the wind. However, the arrow pointing in this direction is actually opposite to the direction the wind is going in a weather forecast. In a standard forecast, if a "West" wind is expected, this is the direction the wind is from (so the wind is actually going East). Therefore, in an alternate embodiment, when the wind pushes the wind direction blade around, the arrow head pointer could point the way the wind is actually going. Constructing the arrow to point in the same direction as the wind would also be consistent with arrows and wind barbs showing wind direction on weather maps and chartplotters, which point downwind not upwind. In this further inventive step, the arrow is detachable with snaps or small nuts and bolts with lock washers, so that the user can select which direction they prefer the arrow to point.

In a further inventive step with the wind arrow, the preferred embodiment is to place it on the wind direction blades as far as possible from the wind cups (as in FIG. 5). It then provides less turbulence and obstruction of the wind speed cups when the boat is heeling. A further inventive step and preferred embodiment is to aim the arrow downwind while placing it at the bottom of the wind direction blade. This helps to move it more out of the path of the wind approaching the wind speed cups, when the boat is heeling over.

Another alternate embodiment for the sensors and bearings uses a low-technology approach with a number of advantages. Rather than using a potentiometer or encoder with bearings for the wind speed, and bearings on the wind direction arrow, it is possible to set center tubes of the wind cups and wind direction blades on a long pin, rod or point. The tube over the pin holds the blades in position while the rotate. Because the rotation is on a point at the end of the pin, there is very little friction. This lets the wind response be ultra sensitive, even in very light puffs of wind. It also means that the blades can be smaller for both wind speed and direction, if they rotate easily even in light winds. At the end of the central pin, the blades could rotate on plastic, or on a metal surface or a jewel bearing—all with virtually no friction. To ensure that the blades didn't move up off the top of the pin, one or more set-screws can be turned into the mounting tube, in a recessed area below where the pin is larger. The mounting tube is slid down on the pin, and the set-screw holds it from coming off.

In this alternate embodiment with the blades rotating on a pin inside a vertical tube and no bearings, no potentiometer or encoder is needed for either wind speed or wind direction. That has the advantage of substantially reducing parts costs. On the wind direction blades, a fluxgate digital compass could still be used. However, those skilled in the art will know that a magnetic Hall Effect sensor can be used to indicate direction (or to count revolutions), with no dead zone. In an alternate embodiment, a Hall Effect sensor disk could be within the encapsulation, and low-cost magnets on the vertical rod. Then, as the wind moves the wind direction blades, the magnetic field triggers the Hall Effect diode disk, which sends signals to the microprocessor indicating wind direction. This approach would need to be calibrated to the front of the boat, unless an optional fluxgate digital compass was still used.

For the wind speed cups, in an alternate embodiment a magnet could be mounted on the bottom of the cups. It does not matter if the magnet gets wet, and there is no external wiring this way. The Hall Effect diode for counting the rotations to determine wind speed can be encapsulated on the circuit board just below the wind speed cups. The magnetic fields on the wind speed cups and wind direction blade can therefore provide wireless transmissions onto the circuit board, with no concerns about seals, wiring or bearings failing.

Figure 6:
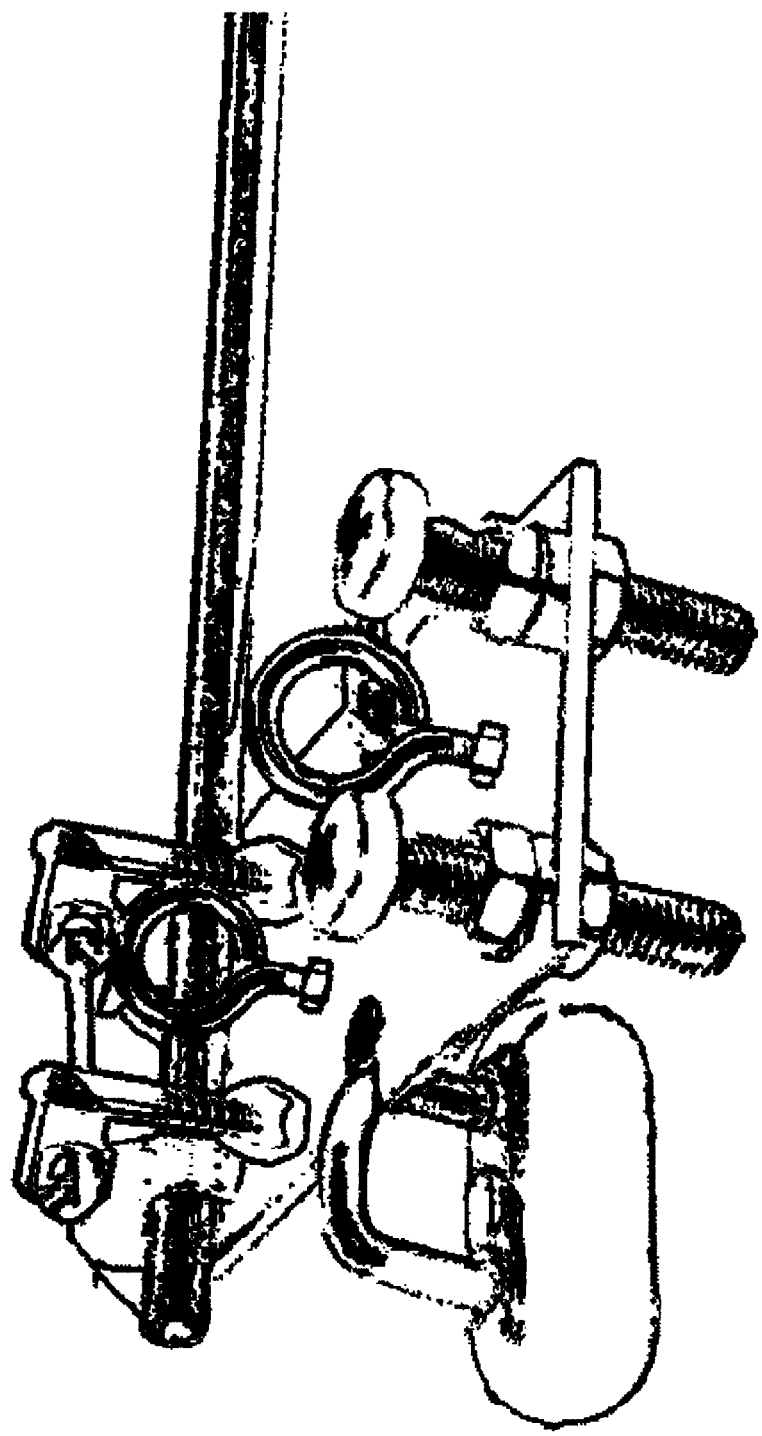
FIG. 6: Mechanism for raising the anemometer in the mainsail mast track. Not shown: cable ties from eye bolts to mast track slides, halyard with light retrieval rope with S-hook on end, and second light rope on indexing plungers for raising/tightening/lowering.
Figure 7:
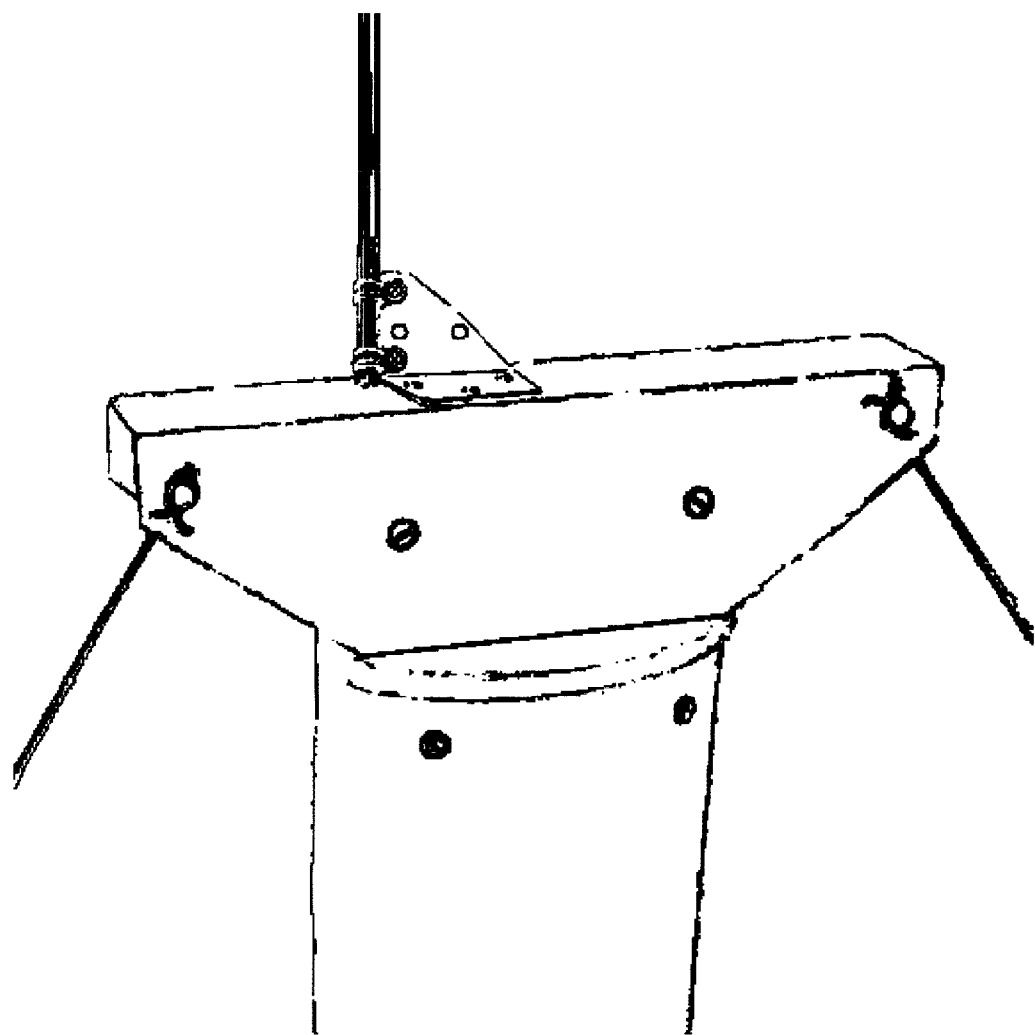
FIG. 7: Base plate mounted on masthead with holes for optional U-bolt for stanchion.
Figure 8:
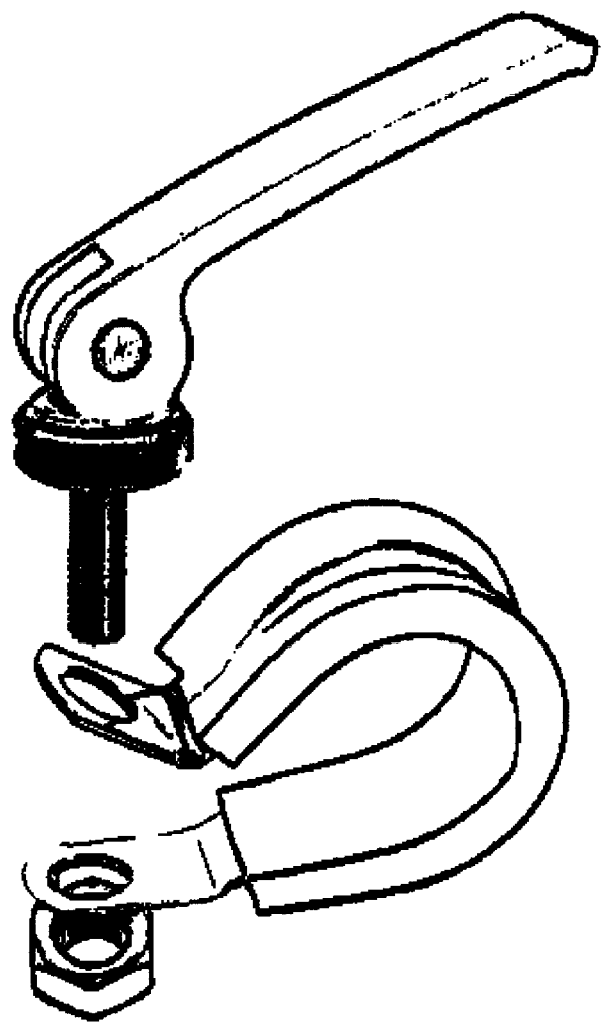
FIG. 8: Adel clamp and adjustable quick-release clamping cam lever.

Sailors need their hands free for handling ropes, sails and the tiller, which makes handheld anemometers awkward. In the preferred embodiment, the machine disclosed here is mounted on a sailboat, with a number of mounting options provided. In the preferred embodiment, cam-clamp quick release levers such as for adjusting a bicycle seat are used to close Adel clamps to grip the main vertical rod (FIG. 8). That way, when the mast comes down, by opening the levers, the rod and anemometer can be released in an instant. In an alternate embodiment, a screw or nut and bolt could also be used to tighten each Adel clamp, without the quick release lever. As shown in FIGS. 6 and 7, the vertical pole could be mounted this way using larger Adel clamps on a stanchion of the lifelines around a sailboat, or with small Adel clamps on a mounting base for the top of a mast, or on the track slider metal plate, or the small Adel clamps could be used to fasten with screws the vertical pole to a wall or the side of the masthead.

The mounting base for the flat surface on top of the mast is shown in FIG. 7. In the preferred embodiment, Adel clamps are used to attach the vertical rod to the side. There are two flat surfaces at right angles to provide a flat horizontal surface with a plurality of screw holes for attaching to the masthead. Holes are also placed in the vertical back surface in case the user wants to attach the plate with a U-bolt that comes with it, as another mounting option.

In an alternate embodiment, rather than permanently mounting the anemometer, the long rod is detached at an adapter thread (visible in FIG. 5 on the vertical rod), so that a handle can be attached to use the device in a handheld format. Although the rod may be thin and solid such as a ⅜ inch rod, it could be threaded just below the wind direction blade, so that the long portion of the rod could be removed, and a pistol-grip handle or foam handle with a ¼" thread could be attached that would often be used as a camera mount. The ¼ inch female mounting thread on the adapter on the end of the rod could also allow the anemometer to be attached to a tripod or other camera mounts for rails or quick releases.

The exposed cup blades could raise issues on a handheld version. To avoid damage to the machine disclosed here, the preferred embodiment is to ship the unit in a low-cost thermoformed plastic holder inside a box, which protects the blade and entire machine in shipping and storage. The exposed cup blades may also raise safety issues in the handheld format. To avoid injury from getting struck by blades spinning rapidly, while not precluding other sizes within the spirit and scope of the invention disclosed here, the preferred embodiment is to make the blade as small as possible while still catching the wind with enough force to rotate even in light winds. A smaller blade is more light-weight and has less momentum, so poses less of a risk or damage or injury if contacted while spinning. In a preferred embodiment with cups 3.5 cm in diameter, the spinning blades simply produce a light tap if a finger is inserted while the cups are spinning. Safety is also improved because the cups rotate with the convex side in front and no sharp edges.

Using the anemometer handheld also raises a question about viewing the results. In the preferred embodiment, a small LCD screen is included on one or both sides of the circuit board to display wind speed and direction. That ensures that the user does not have to try to use a mobile display while also holding up the handheld version of the anemometer. Just as the wind direction arrow can be reversed, although the preferred embodiment is use the LCD to display the direction the wind is coming from, in an alternative embodiment it would be possible to display either the direction the wind is going, coming from or both.

One of the most difficult obstacles with marine anemometers is that they need to be mounted high up in the air at the top of the sailboat mast. This usually requires hard work to winch a crew member up the mast in a bosun's chair, along with a drill, screwdriver and the anemometer. Or, the entire mast needs to be taken down, which usually requires a crane and multiple people. Since there are no wires to run down the mast, an inventive step is used in the preferred embodiment to mount the anemometer at the masthead without climbing or lowering the mast. This novel approach involves using the mast track to raise the anemometer, which is attached with a quick release or permanent fasteners to a base plate. The base plate has notches for a mast track slides above and below it, as shown in FIG. 6. It is attached to these slides with fasteners such as strong cable ties, to an eye bolt on the left and right sides of the plate, which the sailboat owner provides so that they fit that particular mast track. The eye bolt is raised, to allow pulling up and to each side on each of the track slides, to tighten and secure the plate in the track. The plate also has 4 mounting legs which can have rubber feet. The two on one side are threaded, and held in place with lock nuts or threads in the mounting plate holes after adjusting their length for the shape of a particular mast. On the other side, the two mounting legs are indexing cam plungers, as shown in FIG. 6.

To raise the plate with the vertical anemometer rod attached, the halyard rope on the mast track is used to pull the assembly up. A thin rope with a small S-hook on the end is tied onto the halyard buckle to bring it back down. The S-hook allows the halyard to pull the anemometer plate up the mast track. Then, the thin rope can be used to pull the halyard buckle back down again. A second thin rope is attached to the indexing plungers. When it gets to the top, the vertical rod on which the anemometer is held slides up beside the masthead. The halyard is then retrieved with one thin rope, and the other thin rope is pulled to tighten the indexing plungers, which have extendable legs. If the anemometer needs to be lowered down the mast track in future, pulling further on line to the indexing plungers releases the tension, and allows the plate to slide back down the track.

Figure 9:
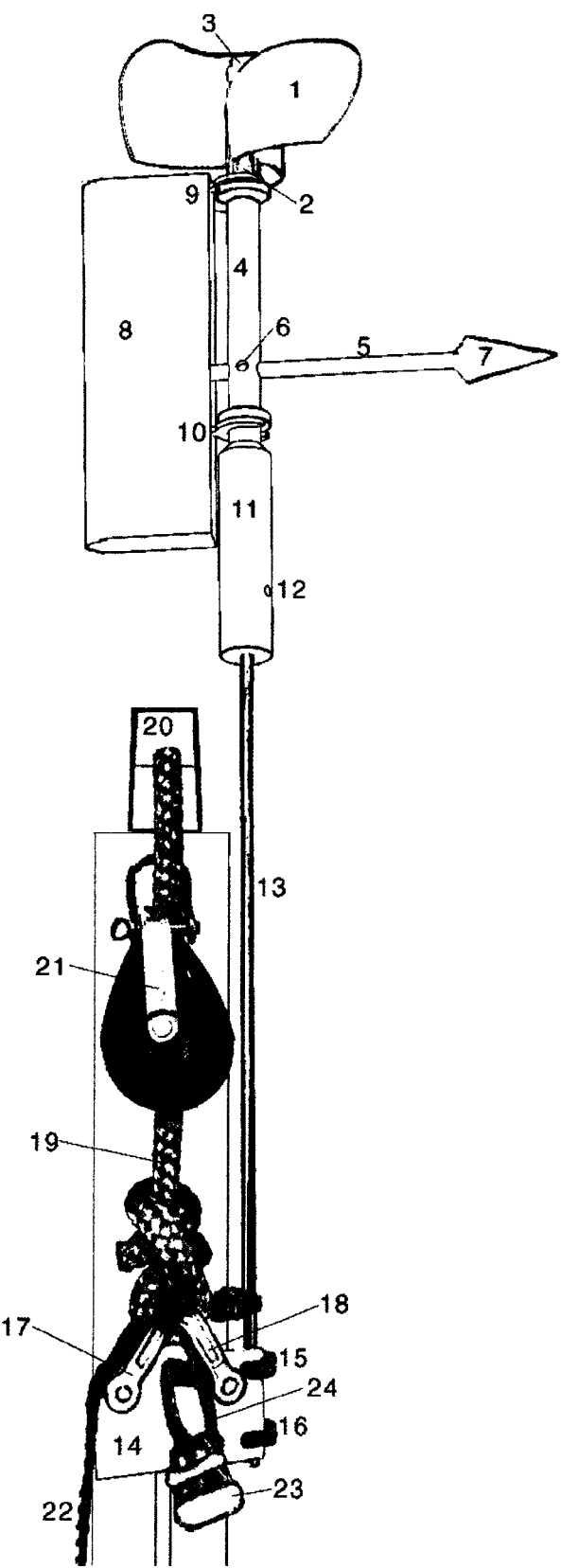
FIG. 9: Wireless anemometer raised in mainsail track without lowering or climbing the mast.

Another preferred embodiment of the wireless anemometer disclosed here is shown in FIG. 9. This is a novel approach because the convenience of simply pulling the device up the mast track without climbing or lowering the mast has not been possible with traditional wired anemometers. FIG. 9 shows the entire apparatus disclosed here, from the wind cups spinning on a needle bearing, to the attachment in the mast track. Reference numerals are used on this figure to designate each of the parts.

Beginning at the top of FIG. 9, the wind cups 1 rotate when the wind blows. There is a hollow shaft up the neck 2 and into the center column of the wind cups, with a jewel bearing 3 at the top. The scaling of the dimensions for all of the parts can be varied, but in this preferred embodiment the upper housing 4 is 2.63 inches tall and 0.38 inches in diameter. There is a horizontal hole through it that can be located anywhere along its length, but in the preferred embodiment is 0.5 inches from the bottom, to keep air turbulence from the wind direction arrow away from the wind cups. The pointer arm 5 is a smaller diameter than the upper housing, 0.188 inches in this preferred embodiment, and passes through the horizontal hole in the upper housing. There is a set screw 6 to lock the pointer arm in place. On the tip of the pointer arm is the nose cone 7, which together comprise the wind direction arrow. The tail of the arrow is numbered 8 in the figure, with the wireless, solar-powered circuit board inside surrounded by plastic encapsulation.

The nose cone 7 is either threaded or glued to the end of the pointer arm 5, so that it is removable. The pointer arm 5 is mechanically attached to the circuit board with machine screws, with a further attachment by the plastic encapsulation to ensure that it is held in place as the wind blows the tail 8 around. In the preferred embodiment, a slot 0.5 inches long and 0.59 inches wide is cut in the end of the pointer arm 5, into which the circuit board fits. Two holes go through the end of the pointer arm 5 where the slot is, for machine screws and nuts to anchor the pointer arm in place on the circuit board.

Two other parts also mount on the circuit board and protrude out of the plastic encapsulation: the upper and lower C- or U-shaped retaining clips numbered 9 and 10 on the diagram. The bottom housing 11 contains a vertical shaft 0.197 inches in diameter with a jewel bearing at the bottom. There is a 0.125-inch peep hole 12 through the bottom housing that provides a view in to the jewel bearing, and that also serves as a drainage hole for any water that enters the shaft. Without limiting the scope of the present invention, the bottom housing in this preferred embodiment has a maximum diameter of 0.625 inches on the outside, and a narrower diameter of 0.375 inches. It is 3 inches long in the preferred embodiment shown in FIG. 9.

In this preferred embodiment, the pointer arm 5 is not too long to avoid serving as a perch for birds. It is longer than the width of the tail 8, so that it can use leverage with the weight of the nose cone 7 as a counter-weight, without adding the full weight of the circuit board and encapsulation. It is important for the nose cone to serve as a counterweight, so that when the sailboat heels over, gravity doesn't cause the tail 8 to fall if it is heavier, which would contaminate the wind direction readings. In this preferred embodiment, the nose cone is brass, which a heavy type of metal yet non-corrosive. Although other shapes for the nose cone could be used without limiting the scope of the invention, in the preferred embodiment, using a shape for the nose cone 7 as shown in FIG. 9 allows it to appear like an arrow head when viewed from down on the boat and also when viewed from the side. In the preferred embodiment, the angle between the back side of the arrow 7 and the pointer arm 5 is greater than 90 degrees, although an arrow often would have an angle less than 90 degrees. An angle greater than 90 degrees is used in this preferred embodiment to minimize suction and air turbulence behind the nose cone 7.

There are two needle bearings, comprised of a concave or V-shaped jewel facing a pin on the end of an axel in the shaft of the wind cups 1 and bottom housing 11. Axles extend into these shafts from the upper and lower ends of the upper housing 4. These axles can be thinner parts of the upper housing, or can be separate materials that are attached by threading or press-fitting or gluing into the upper housing 4. The sizes can be scaled, although without limiting the scope of the invention the holes in the ends of the upper housing in this preferred embodiment are 0.188 inches in diameter and 0.25 inches deep. Axles of the same size can be threaded or pressed or glued into the hole in each end of the upper housing 4, with a pin press-fit or glued into a smaller hole on the end of each axle. Again, the holes for the pins can be scaled without limiting the scope of the invention, and to fit pins of various sizes, but in this preferred embodiment are 0.13 inches deep and 0.05 inches in diameter. In the preferred embodiment, the pin has a needle point on both ends, which makes it easier to press the pin into the hole on the end of each axle. Once the pin is in the end of the axle on the upper and lower ends of the upper housing 4, they allow the wind cups to spin and the wind direction arrow to rotate.

For detecting the spinning of the wind cups to determine wind speed, a non-contact magnetic sensor is used. This novel approach allows signals from the wind cups to go to the circuit board without any seams or wiring. Ordinarily the wind cups spin on the ball bearings and axel of a potentiometer or similarly-shaped reed sensor. However, that approach is not submersible, requires expensive parts for the ball bearings and electronics in a potentiometer-type housing, and has more friction the better-sealed it is. But how can we get a signal from the spinning wind cups to the circuit board without using a potentiometer axel wired to a circuit board? In the preferred embodiment shown in FIG. 9, a small magnet is used as an inventive step, since its magnetic field can reach across the gap to the circuit board, and through the plastic encapsulation. A tiny magnet of non-corrosive material is mounted in the flange on the lower end of the neck 2 of the wind cups, being glued or press-fit into a hole in the flange where it is protected. The magnet's size and power is selected so that the magnetic field is strong enough to reach to the top edge of the circuit board, but drops off to below the earth's ambient magnetic field before reaching the lower edge of the circuit board, where the digital compass is located. A magnetic sensor is mounted at the top inner edge of the circuit board near the retaining clip 9. Each time the wind cups rotate, the magnet in the flange comes past, and the change in magnetic field triggers a response in the magnetic sensor, with the frequency of responses indicating the wind speed.

In this preferred embodiment shown in FIG. 9, the jewel bearings at 3 and 12 are obtained from a supplier set in a brass threaded housing, although other forms of mounting the jewels is possible, such as press-fitting them into a thin shaft. But in the preferred embodiment they can then be mounted by screwing them into small corresponding threads from the top of the wind cups 1 and from the bottom of the bottom housing. To assemble the mechanical components of the overall anemometer shown in FIG. 9, the axles are placed in the upper housing 4, and the wind cups 1 and lower housing 11 are placed on the axles. The pointer arm 5 extends from the plastic tail section 8, as do the two C-shaped retaining clips 9 and 11. There is a flange on the bottom of the wind cups 1 and on the top of the lower housing 11, and it would be alternately possible to use O-shaped retaining clips and no flanges. But in this preferred embodiment, after the parts are in place on the axles vertically, the pointer arm 5 slides through the hole in the upper housing with the set screw 6, until the retaining clips 9 and 10 are in place. The set screw can then be tightened on the pointer arm, which has the effect of holding the wind cups and axles in place too.

The retaining clips 9 and 10 are not intended to touch the shafts they encompass, to minimize wear. The lower housing 11 and the wind cups can be made of a material like acetal plastic that is wear-resistant, somewhat self-lubricating and very low friction (like nylon, but with less moisture absorption). If the sailboat heels over away from the wind and the wind cups try to rise, the retaining clips 9 and 10 hold everything in place vertically. In the preferred embodiment, C-clips 9 and 10 are both the same shape and made of a non-corrosive material such as aluminum. They could also be stainless steel, although it is preferred to use materials that minimize the weight. The inner diameter of the C-clips should be larger than the diameter of the neck of the wind cups 1 and than the neck of the lower housing 11, but smaller than the diameter of the flanges on the wind cups 1 and lower housing 11. That way, if there is upward force, the C-cups hold everything in place. The flanges should be able to rub on the C-clips for many years with a low-friction material like acetal and smooth surfaces on the C-clips and flanges, without wearing down. In the preferred embodiment, jewels in the upper and lower jewel bearings are used in threaded housings for easier assembly. These housings have an opening for the V-shaped jewel on the inner end, and a tiny screwdriver fitting on the outer end, for turning them into place at 3 and 12 in FIG. 9. If there is any wear or loosening of parts, the jewel threads can also be tightened or loosened to ensure that there is just a slight gap between the flanges on the wind cups 1 and lower housing 11, so that there is not continual friction and also not too much movement before the flanges contact the retaining clips.

In the preferred embodiment shown in FIG. 9, the inner diameter of the C-clips is 0.4 inches, and the outer diameter is 0.69 inches across the C. The overall length is 1.1 inches. On the end of the C-clip that goes inside the plastic of the tail, there are two prongs with a 0.059 inch gap between them that slides snugly over the circuit board. There are protrusions or teeth on the sides of the prongs to anchor the prongs in the encapsulation plastic. In the preferred embodiment, the thickness of the C-clips is 0.06 inches, which makes them more than stiff enough in aluminum or stainless steel to hold the parts in place in the wind, and even if small sailboats flip causing the anemometer and wind cups to crash against the water.

The circuit board is encapsulated or "potted" in the tail of the wind direction arrow 8, to ensure that it is completely waterproof Although this provides more permanent moisture protection than a gasket in a typical waterproof case, it means there are no wires or buttons through the plastic to control the circuit board. However, the circuit board cannot stay on all the time, or it would use excessive battery power. There are two preferred embodiments to preserve power, either or both of which can be used. One preferred embodiment is to allow the circuit board to power down and go to "sleep" if it is not communicating. This saves power from calculations in the micro-controller and transmitting power. Periodically, the circuit board can come on very briefly, even just for a few milliseconds, to check if a user wants to communicate. A transmission rate can be set such as X times per second based on the power available, and this could be varied if faster data is needed or if power needs to be preserved. The same is true for the sleeping intervals. If no user is present, the circuit board could sleep for 8 seconds and briefly check again for a user. If this goes on for a certain amount of time (e.g. 1 week), the time interval could be lengthened.

If the user takes the device out of storage and tries to communicate, they may not be able to tell if the unit is taking some time to wake up or if the batteries are flat. Therefore, in a second preferred embodiment, a physical switch is used to power down the unit for long-term storage. Although a switch wired to the circuit board would ordinarily be used, in this case we do not want wires that can cause moisture leaks, or that can wear out. Therefore, we need a switch that can be activated remotely. But if we need to wake up the circuit board to get it to transmit, how can we send it a signal remotely while it is sleeping? In this preferred embodiment, we use a magnetic switch or reed sensor on the circuit board, which is activated by an external magnet. In this way, we can reach through the plastic encapsulation with the magnetic field, to turn the unit off. The external magnet could be stuck with tape or velcro to the outside of the tail of the wind direction arrow to hold the switch in the OFF position, although in the preferred embodiment the magnet is mounted in the case that the device comes in, beside where the tail 8 sits in the case. Then when the device is placed in the case, it goes OFF, and when it comes out of the case, it can wake up and begin functioning. Ordinarily placing a magnet around the digital compass would cause problems. But since the magnet is only present when the device is off, the magnet does not cause problems with the digital compass.

Below the lower housing 11 there is a stainless steel support rod 13. In the preferred embodiment this is 12 inches long, and ¼-inch in diameter, made of 316-grade stainless steel, which is particularly non-corrosive. The top one-quarter inch of this rod is threaded with a standard ¼-inch thread, which fits into a thread tapped in the bottom end of the lower housing. Although it is possible to glue the thread in place to lock the support rod permanently onto the anemometer, this can be used as a quick-release when the boat is being launched or hauled out for the off-season and the mast is being raised or lowered. It only takes a few seconds to unscrew the lower housing from the support rod. With most masthead anemometers, there are tools and wiring and plugs that need to be dealt with—but with the invention disclosed here, the anemometer can be removed from the support rod with no tools in seconds.

Once removed, in the preferred embodiment shown in FIG. 9, there is space on the lower part of the lower housing 11 to hold it below the tail 8, for handheld use. Most masthead anemometers are over 2 feet wide, yet this one is less than 1 inch wide at the base, giving it a novel advantage for being able to be mounted at the masthead or also small enough to be used handheld. The standard ¼-inch thread can also be used with a camera tripod, or with a camera handgrip or other mounts.

The 12-inch stainless steel support rod 13 can be mounted on the masthead with an L-bracket, or with P-clips (i.e., Adel clamps) to the side of the masthead or a bulkhead. It can also be attached with hose clamps to a stanchion or pole, although in the preferred embodiment two hose clamps are used with a wing nut handle on them that do not require tools to install or remove. Without limiting the scope of the invention if other sizes are required in unusual cases, in the preferred embodiment these wing-nut or butterfly hose clamps have a 1.5-inch diameter to fit standard sailboat stanchions. As shown in the lower part of FIG. 9 though, the invention disclosed here also enables a unique approach for mounting the anemometer at the top of the mast by using the mainsail mast track. This allows the anemometer to be used in clean air above the sails, even if installed in the middle of the sailing season when the boat is already in the water and the mast is already raised, without needing to climb or lower the mast.

In this preferred embodiment, the support rod 13 is attached to the base plate 14 of the track slider assembly with two P-clips (Adel clamps) numbered 15 and 16 in FIG. 9. The P-clips are stainless in the preferred embodiment for strength and to be non-corrosive. Grooves are added under the two P-clips 15 and 16, of a width that the P-clips fit into, 1/32 inch deep, and separated to match the holes in the base plate 14. The base plate 14 is of a sturdy non-corrosive material such as 1/8-inch-thick aluminum or stainless steel. It has a V- or U-shaped notch on the upper and lower sides that is approximately 1 centimeter across and 0.3 inches deep vertically, for track slider cars. In this preferred embodiment, the base plate goes in-between a lower slider car (numbered 23 in FIG. 9) and an upper slider car (not visible underneath the base plate 14 in FIG. 9). These slider cars, also called slugs, are tightened together using a 50-pound strong plastic cable tie 24. However, it is also possible to tie the cars together with other fasteners, or to lash the base plate 14 to only one slider car to minimize space if necessary. Once the base plate 14 is attached to the slider cars, it provides a simple mechanism that slides up or down the mainsail track, to raise the wireless anemometer without needing to climb or lower the mast.

In the preferred embodiment, two small U-shaped shackles 17 and 18 are attached to holes in the upper side of the base plate 14. It may be possible to use one or to tie the mainsail halyard 19 directly to the base plate 14, although two shackles are preferred, to hold the base plate level. The mainsail halyard 19 can then be raised to move the anemometer up the mast track, until the anemometer extends above the masthead 20. The base plate 14 is designed to be flat against the mast, so that the mainsail and halyard can pass over it. Since the mainsail halyard is being used to raise the anemometer, a second block or pulley 21 needs to be used to then raise the mainsail. This can be attached to the original mainsail halyard 19, either above or in the knot or shackle connecting the halyard 19 to the shackles 17 and 18 on the track slider base plate. By connecting the block 21 above the track slider, the mainsail can still be raised to approximately the same height. In an alternate embodiment, the new block pulley could also be attached directly to the base plate, although many sailboats may prefer to keep it higher than this unless they have extra space on the mast above their sail.

It is also important to note that although the track slider may be 1 inch high on the mainsail track, on most sailboats it should not interfere with the top of the mainsail, which usually has a stiff plate on the top 4 inches or so of the main sail, and no slider cars there. There is only a grommet on the top corner of the main sail to attach to the halyard. This is an important part of the innovation disclosed here, since we discovered that on most sailboats the stiff plate should move right past the track slider without touching it.

Since the mainsail halyard is being used by the track slider base plate, a new halyard needs to be added in block 21. This halyard or rope is not shown in FIG. 9, but is then used to raise the mainsail to its normal position. Finally, a thin line is also added, which is numbered 22 in FIG. 9. This thin line allows the track slider and anemometer assembly to be pulled back down, if gravity alone is not enough. But the thin line is tied in a novel way in order to adjust the vertical orientation of the anemometer extending above the masthead. The end of this thin line 22 is tied to the mounting rod 13, and then passes through shackles 17 and 18, before heading down the mast to be tied off out of the way at the base of the mast or at deck level. Because the thin line goes horizontally from the axle of shackle 17 to the mounting rod 15, when it is pulled from down on the deck it exerts sideways force on the mounting rod. So the anemometer can be leaning out when raised up the mast, which may help the wind direction arrow to clear the masthead. Then when the anemometer is at the top, the thin line 22 can be pulled tight, to pull the mounting rod 13 against the mast, in a vertical orientation parallel to the mast. This holds the anemometer vertical above the mast, in addition to the anchoring provided by the two track slider cars attached to the base plate.

Figure 10:
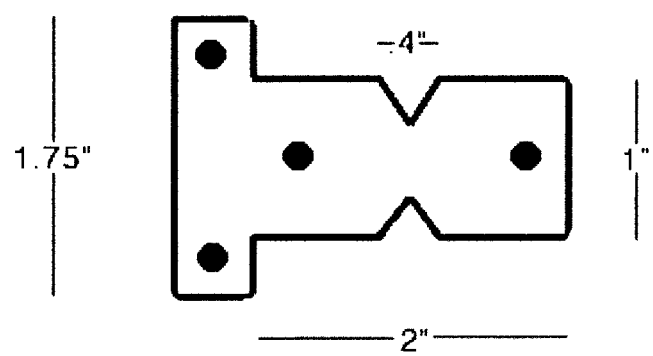
FIG. 10: Base plate with V-notches attaches to slider cars for raising up mainsail track.

FIG. 10 shows another preferred embodiment of the track slider base plate in more detail. The main dimensions are included (in inches), without precluding other sizes within the spirit and scope of this part of the invention. The P-clips for the mounting rod can be attached to the two vertically-oriented holes. The U-shaped shackles go through the two horizontally-oriented holes, and are connected to the mainsail halyard. The track slider cars fit into the V-shaped notches in the base plate to hold this base plate and the anemometer above in the correct orientation, and are joined together with a cable tie.

In addition to the track sliders for raising the anemometer in FIGS. 6 and 9, in a third preferred embodiment, the wireless anemometer can be raised with a loop or U-shape (marked as 1 in FIG. 11) attached or welded to the mounting rod 2 in FIG. 11, three inches from the bottom of the mounting rod (although other distances also work that are below the top of the mounting rod). An important part of the inventive step is that the loop 1 is not at the top of the rod, so that the length above the loop will cantilever and protrude above the pulley (and masthead) when the U-shaped loop 1 is pulled up on a rope. It won't fall over because a line is attached to the foot 3 of the mounting rod, to pull it vertical. Wired anemometers have not been able to do this previously, which is why this is a novel mounting approach afforded by this new wireless anemometer design.

This U-shaped loop 1 is metal round-bar 3 mm in diameter in the preferred embodiment, enclosing a hole that is 9 mm in diameter vertically and horizontally. A halyard can be attached to this U-shaped loop, to raise the wireless anemometer up the mast or up a burgee halyard. At the lower end of the mounting rod, a thin halyard or rope can also be tied to a hole in the mounting foot 3. However, as shown in FIG. 7, other embodiments for mounting, and loops or holes for pulling down on the bottom of the mounting rod, can also be used instead of a welded-on foot, without departing from the spirit and scope of the invention. When the anemometer is raised by connecting a halyard to the U-shaped loop, the thin line can be pulled on the bottom, to pull the mounting rod 2 into a vertical orientation. In the preferred embodiment, the simplest attachment for the thin line is to tie a thick knot in the end that is larger than the diameter of the hole in the foot plate, and pass the line down through the hole, so that it can be tensioned from down below to pull the mounting rod and anemometer into vertical orientation. This allows the mounting rod and anemometer to protrude up above the mounting point, such as above the masthead.

In the preferred embodiment, the foot 3 is welded to the bottom of the mounting rod, so that it can be conveniently attached with machine screws and tapped holes or nuts, or with screws, to the horizontal top surface of the masthead. The preferred dimensions of the foot are 21×21 with 3 mm thickness. The entire unit shown in FIG. 11 would be 316L marine grade stainless steel. At the top end there is a standard ¼-inch thread (20 UNC-2A) that is 14.61 mm long in the preferred embodiment, to screw in to the spindle 12 of the wind sensor in FIG. 9 (since that also fits a standard ¼-inch camera mount for tripods and other camera mounts such as hand grips).

An L-bracket with matching holes to the foot 3 can be used if the anemometer is being mounted to the side of the masthead, mast or a wall or post. In the preferred embodiment, the short leg of the L-bracket is 21×21 millimeters, to match the foot 3. The long leg of the L-bracket is 2 inches long, with 3 holes lengthwise along it, which match 3 vertical holes in the base plate of the mast track slider. In the preferred embodiment 4.5 mm holes are used so that they can be bolted together with #8×½ inch stainless steel screws and lock nuts, although other sizes could be used.

An extension bar can also be used, to move the anemometer away from the masthead, which in the preferred embodiment would be forward of the mast towards the bow, where the wind is undisturbed. In the preferred embodiment, this extension is 16 inches long, 21 mm wide, and 3 mm thick, of stainless steel, although other dimensions and materials could be used. The extension has four holes in one end to match the foot 3, and the same pattern of four holes in the other end to match the L-bracket. In the preferred embodiment, 316 marine grade stainless steel is used for the Mounting Rod in FIG. 11, the L-bracket and extension (as well as the track sliders in FIGS. 10 and 6).

Figure 11:
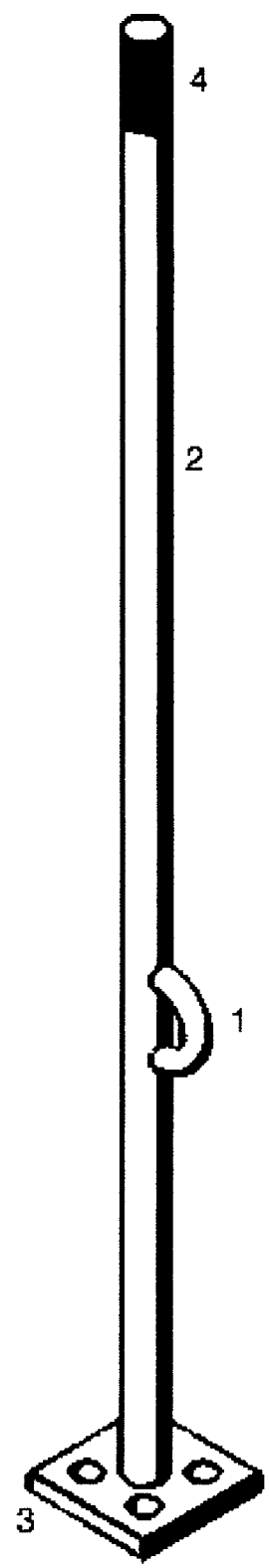
FIG. 11: Mounting rod with U-loop for raising above masthead on halyard.

The advantage of this design using the loop as shown in FIG. 11 is that it allows the anemometer to be raised without using the mainsail mast track. That is simpler than having to add a separate pulley on the mainsail halyard, and avoids sails that need all of the space at the top of the mast track. It also is simpler than using a base plate in the mainsail track. So a sailor could try this approach first, and if they didn't have a free halyard to hook on loop 1 on FIG. 11, the could then use the track slider shown in FIG. 10 or 6.

Some sailboats have a burgee halyard going from the deck to a spreader between the mast and the stays and rigging. Although it would be quite possible to use the arrangement shown in FIG. 11 to raise the anemometer using the burgee halyard, raising it above a side deck to a spreader is not the preferred embodiment, since the wind would be blocked by the sails on some tacking angles. In the preferred embodiment for this mounting method, a burgee (flag) halyard is used to raise the anemometer up the mast, so that it can extend up above the masthead where the air is not blocked. In the preferred embodiment, this is done using a burgee halyard to the masthead or a spare halyard for a foresail such as an extra jib, genoa, or spinnaker.

In an alternate embodiment, it would even be possible to attach a halyard shackle to the U-shaped loop (numbered 1 in FIG. 11), which is also attached to a stay or a side shroud, along which it is pulled up. In this alternate embodiment, when the halyard is pulled, the anemometer moves up a stay or shroud as high as desired. Then a line on the lower end of the mounting rod is pulled from below, to keep the anemometer upright. Some skippers may also find that it is possible to use the U-shaped loop and an extra mainsail or burgee halyard, to raise the anemometer beside the mast track.

The three preferred embodiments described above for raising the wireless anemometer without needing to lower the mast or to climb the mast are an important innovation, that has not been possible with previous wired anemometers. With those, a person had to get to the top of the mast to install the wiring for the anemometer. But with the wireless anemometer described here, the anemometer can be pulled up from deck level for the first time, without going to the considerable expense and effort of lowering the mast or climbing the mast. This is a major improvement in mounting methods, that took about a year of research to develop and refine. Anemometers have never been raised this way before. Most masts, mast tracks and mastheads have unique individual sizes and shapes, which also made it difficult to create a single apparatus. But the importance of these innovative procedures for raising the anemometer from deck-level is that sailors don't need to wait until next year to get and start using this wireless anemometer, if their sailboat is already in the water and the mast is already raised. They can get the wireless anemometer and start using it as soon as they have raised it with one of these three preferred embodiments. So aside from being novel and non-obvious, these three preferred embodiments (illustrated in FIGS. 6, 9 and 11) for raising the anemometer solve an important problem for sailors.

Once the anemometer has been mounted and is in use, in the preferred embodiment, wind data is sent in a transmission requiring low power such as Bluetooth Low Energy from the circuit board on the anemometer, in a format that can be received on mobile devices and wireless receivers such as html or NMEA. In an alternative preferred embodiment, the data can be sent from the anemometer circuit board to a base unit that includes wiring for on-board networks, and which also could send out the data and tacking results in formats including but not exclusive to html and NMEA using other wireless methods such as but not exclusive to wifi, which require more power. This base unit could also be wired in to DC or AC power.

In a further preferred embodiment, rather than just sending wind data, it is also possible to put calculations of the optimal tacks, tacking distances and time in a method such as Summers' U.S. Pat. No. 8,135,504 into an interactive web server on the circuit board of the wind vane or its' base unit. The server can then send the data in interactive web pages wirelessly or by ethernet or NMEA cable to an onboard network. Sending out interactive html from a server allows anyone with a compatible device that has a web browser to display wind data and also tacking results.

In a further preferred embodiment, wind and battery data or tacking results could be sent to a device that has an internet connection (e.g., a computer or smartphone). The internet connection could be used to display data on wind, batteries and or tacking results for one or multiple users, online. That could be useful for people wanting to see race results, tacking information and wind information remotely, or for aggregating wind data or tacking results into maps or other forms of graphic, table or text data online.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed is:

1. A solar-powered, waterproof machine with wind cup blades with a concave curve or tilt towards the wind at the top and a flatter more vertical surface towards the bottom to measure wind speed and wind direction equally well whether upright or tilted, and that transmits this data wirelessly in NMEA, html, text or other formats.

2. The machine defined in claim 1 with blades that move in the wind to measure wind speed and direction whether upright or tilted, wherein said wireless data is transmitted on wind speed, wind direction, battery levels, optimal tacks, tacking distances and times, from a circuit board in the anemometer or inside the wind direction arrow or blade.

3. The machine defined in claim 1 with blades that move in the wind to measure wind speed and direction whether upright or tilted, wherein a low-power transmitter is used that can be powered by small solar panels to avoid the cost and need of a base unit with an additional power supply, for transmitting to devices such as marine electronics, computers, mobile devices, electronic book readers, smartphones, tablets, browsers or apps, so that the content can be viewed on the receiving device, entered into an onboard network or re-transmitted by a device with an internet connection to an online server displaying the wind data and tacking results in written, diagram, audio, map or other formats.

4. The machine defined in claim 1 with blades that move in the wind to measure wind speed and direction whether upright or tilted, which is sturdy and waterproof for mounting on sailboats of all sizes including small centerboard, trailerable and beachable sailboats that can flip, with said wireless transmissions being sent for mobile devices in waterproof bags or cases, to give small sailboat operators the same navigation electronic displays, wind information and tacking results as on large yachts.

5. The machine defined in claim 1 with blades that move in the wind to measure wind speed and direction whether upright or tilted, wherein a gimbal, swivel, hinge or bearing is oriented front-to-back in a boat to keep the cups and wind direction arrow upright so that it responds with equal precision regardless of the amount of tilt or heel in the sailboat.

6. The machine defined in claim 1 with blades that move in the wind to measure wind speed and direction whether upright or tilted, wherein one or more lightweight colorful wind speed cup blades have a concave curve or diagonal tilt towards the wind at the top to catch the wind, with the back edge open like a wing, on arms, or connected to a central pillar, and with the lower part of the blade either vertical or leaning towards the wind and either flat or cupped to catch horizontal wind when upright, so that the blades move away from and into the wind like wind cups with wind from the side, but like a propeller with wind from below.

7. The machine defined in claim 1 with blades that move in the wind to measure wind speed and direction whether upright or tilted, wherein the size, thickness, weight, curvature and angular orientation of the wind speed cup blades can be adjusted, as can a protruding surface circling the central pillar below the cup blades to present a thin edge to horizontal wind but a flat plate increasingly obstructing the wind with more tilt if braking is needed when tilted, to ensure a linear relation between wind speed and the number of rotations regardless of the amount of tilt away from the wind.

8. The machine defined in claim 1 with blades that move in the wind to measure wind speed and direction whether upright or tilted, wherein horizontal surfaces are minimized to avoid bird perches, with a pointed cone or pole above the wind cups and the wind cups mounted with a perpendicular set-screw on the axle of a waterproof potentiometer or encoder sensor that indicates rotations, which is in turn attached with a bushing and/or encapsulation to a fixed circuit board on the vertical mounting rod or directly on the rotating wind direction arrow like the minute and hour hands on a watch which are both on the same axis but can rotate independently.

9. The machine defined in claim 1 with blades that move in the wind to measure wind speed and direction whether upright or tilted, wherein the circuit board, rechargeable batteries, solar panels and electronics are encapsulated with a clear, UV-resistant moldable doming compound or material such as urethane, epoxy or acrylic sealant to seal, form and/or give structural strength to the wind direction arrow/blade, dissipating heat directly into the air, with no external wiring, no air around the electronics to avoid problems with condensation, and optically clear for any solar panels, LED warning lights and LCD displays of wind speed and direction inside.

10. The machine defined in claim 1 with blades that move in the wind to measure wind speed and direction whether upright or tilted, wherein the larger part of the wind direction tail blade is on one side of the axis of rotation and a counterbalanced smaller area of the blade or weight is on the other side of the axis, in which the arrow on the blade for wind direction could be at any height level on the wind direction blade including the bottom to be most distant from the wind speed cups, and could point into the wind as is traditional, could be constructed to point in the direction the wind is going, or could be detachable and reversible.

11. The machine defined in claim 1 with blades that move in the wind to measure wind speed and direction whether upright or tilted, wherein the vertical rod goes through one or more ball bearings, pillow block bearings, or terminates in a vertical tube attached to the circuit board, which is given a smooth surface and equal thickness on both sides using the doming/encapsulation compound or a clear thin external cover if needed to reduce weight.

12. The machine defined in claim 1 with blades that move in the wind to measure wind speed and direction whether upright or tilted, wherein a fluxgate digital compass is attached to the circuit board to calibrate a wind direction potentiometer or encoder, or determine wind direction directly, to avoid a dead band, external wiring, and the need for calibration to the boat's heading, even providing accurate direction on a rotating mast.

13. The machine defined in claim 1 with blades that move in the wind to measure wind speed and direction whether upright or tilted, wherein any effects of tilt on the wind speed cups or wind direction arrow that are not corrected with physical characteristics of the cups and blades are adjusted in software, after using an inclinometer (tilt sensor) to index the distortion in measurements throughout the ranges of tilts, wind speeds and/or wind angles, and offsetting this by adding a correction of the same amount for the given tilt, wind speed and/or wind angle.

14. The machine defined in claim 1 with blades that move in the wind to measure wind speed and direction whether upright or tilted, wherein the overall design is lighter and more vertical than standard mounted marine anemometers that typically need at least a 6-inch circle for the cup rotation and at least one foot for the wind arrow rotation on a horizontal rod 1-2 feet in length, so that this smaller more vertical invention will fit past the masthead if slid up the mast track, is suitable for use on small sailboats or handheld, and uses a thin and light hollow or solid vertical pole or rod made of a non-corrosive material.

15. The machine defined in claim 1 with blades that move in the wind to measure wind speed and direction whether upright or tilted, which can be raised above the top of the mast remotely without climbing or lowering the mast, using a small metal plate that pulls up and to each side on mainsail track slides with fasteners such as cable ties or ropes and which fit in notches above and below the plate, with one or more legs on each side which may have rubber feet for stabilizing, and indexing cam plunger legs on at least one side which are loose while being raised up the mast by the halyard pulling an S-hook on a thin rope tied to the halyard buckle, said thin rope later being able to pull the halyard back down, with another thin rope which can be pulled down to tighten the levers of the indexing plungers when said metal plate gets to the top of the mast track, with the light rope being tied off at the foot of the mast and also being able to be pulled farther to release the plunger tension for lowering the anemometer in future.

16. The machine defined in claim 1 with blades that move in the wind to measure wind speed and direction whether upright or tilted, wherein Adel clamps are used for fastening the vertical anemometer rod to the side of the masthead, to a mounting base on top of the masthead or on a horizontal extension bar extending out from the masthead, to a stanchion on the lifelines around the boat, or to a sliding mainsail track plate, said Adel clamps being tightened with nuts and bolts or with quick-release cam levers.

17. The machine defined in claim 1 with blades that move in the wind to measure wind speed and direction whether upright or tilted, wherein the vertical rod is detachable at a threaded adapter sleeve with optional lock nuts, so that a handle can be attached to use the device in a handheld format, or a standard ¼-inch bolt from a tripod, or other camera mounts for rails or quick releases.

18. The machine defined in claim 1 with blades that move in the wind to measure wind speed and direction whether upright or tilted, wherein the cup blades are stored and shipped in a low-cost fitted tray holding the unit inside a box to protect it during shipping and storage, with said blades made as small as possible while still catching the wind with enough force to rotate the waterproof potentiometer even in light wind, to pose less of a risk of damage or injury if contacted while spinning.

19. The machine defined in claim 1 with blades that move in the wind to measure wind speed and direction whether upright or tilted, wherein the wireless data can be received on a separate accessory base unit with a wiring port for on-board networks in industry-standard formats such as NMEA or ethernet, and AC and/or DC power wires for said on-board networks or for transmitting other wireless signals that require more power such as wifi.

20. The machine defined in claim 1 with blades that move in the wind to measure wind speed and direction whether upright or tilted, wherein the anemometer and/or the base unit can transmit data or interactive web pages as a server, for wind data or tacking results such as optimal tacks, tacking distances and times, to devices that have a required app, are on a network of marine electronics, have an internet connection, or that may be able to receive a wireless signal and have a web browser.

21. The machine defined in claim 1 with blades that move in the wind to measure wind speed and direction whether upright or tilted, wherein vertical center tubes of the wind cups and/or wind direction blades ride on a long pin, rod or point held in position by set screws or clips in a recess on the rod, to rotate in position with very little friction from plastic, metal or a jewel rotating on the tip, which allows ultra-sensitive response even to light wind and no costs or maintenance for bearings.

22. The machine defined in claim 1 with blades that move in the wind to measure wind speed and direction whether upright or tilted, wherein a magnetic sensor can be used for the wind speed cups and/or wind direction blades, allowing all of the electronics to be encapsulated with no seal or bearings or wiring, using one or more external magnets on the wind speed cups above the circuit board for counting rotations for wind speed, and on the rod near a diode disk in the circuit board to measure direction, avoiding the need and cost of a potentiometer or encoder for wind speed, avoiding a potentiometer dead zone in wind direction, and making a fluxgate digital compass optional for wind direction calibrating.

23. The machine defined in claim 1, which can be raised in the mast track without climbing or lowering the mast, by inserting one or two track slider cars into notches above and below a base plate attached to the anemometer mounting rod, and using the mainsail halyard to raise the base plate and a pulley block for a new mainsail halyard, so that the top corner-plate of the mainsail can pass over the base plate, with a thin tensioning line from the mounting rod passing down the far side of the base plate to straighten the mounting rod vertically or to pull down the anemometer when the halyard is loose.

24. The machine defined in claim 1 with blades that move in the wind to measure wind speed and direction whether upright or tilted, wherein the device can be powered down to preserve power through software controls from the user, or with longer hibernation before checking for the user if not used for increasing lengths of time, or with a magnetic switch or reed sensor on the circuit board inside the encapsulation, which powers down the device when it is placed in storage near a magnet that could be mounted in the storage box.

25. The machine defined in claim 1 with blades that move in the wind to measure wind speed and direction whether upright or tilted, wherein the mounting rod can be attached to the masthead with (a) nuts and bolts or screws through holes in a foot plate on the mounting rod, which could also use an extension or L-bracket for the optimal mounting location, or (b) the mounting rod can be pulled up the mast with a U-loop below the top of the mounting rod, allowing the top end to cantilever above the halyard pulley, held vertical by a rope pulling downward and attached at the bottom of the mounting rod.

\* \* \* \* \*